United States Patent
Suzuki et al.

(10) Patent No.: US 9,565,568 B2
(45) Date of Patent: Feb. 7, 2017

(54) SHARING CHANNELS IN A LICENSED-ASSISTED ACCESS IN LONG TERM EVOLUTION OPERATION

(71) Applicant: BlackBerry Limited, Waterloo (CA)

(72) Inventors: Takashi Suzuki, Ichikawa (JP); Eswar Vutukuri, Hampshire (GB); Nicholas William Anderson, Devon (GB); Mohammed Nawaf Smadi, Ancaster (CA); David Philip Hole, Hampshire (GB); Stephen John Barrett, Haywards Heath (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/542,414

(22) Filed: Nov. 14, 2014

(65) Prior Publication Data

US 2016/0142920 A1    May 19, 2016

(51) Int. Cl.
| | |
|---|---|
| H04W 16/14 | (2009.01) |
| H04W 72/04 | (2009.01) |
| H04W 72/12 | (2009.01) |
| H04W 84/04 | (2009.01) |
| H04W 74/08 | (2009.01) |

(52) U.S. Cl.
CPC ......... *H04W 16/14* (2013.01); *H04W 72/0446* (2013.01); *H04W 72/1215* (2013.01); *H04W 74/0808* (2013.01); *H04W 84/042* (2013.01)

(58) Field of Classification Search
CPC ............. H04W 72/0433; H04W 88/10; H04W 72/1289; H04W 24/08; H04W 72/085; H04W 72/0446; H04W 72/1215; H04W 74/0816; H04W 84/045; H04W 74/0808; H04W 72/1226; H04W 16/14; H04W 84/042
See application file for complete search history.

(56) References Cited

U.S. PATENT DOCUMENTS

| | | | |
|---|---|---|---|
| 2013/0315152 A1* | 11/2013 | Ratasuk .............. | H04W 76/023 370/329 |
| 2014/0341155 A1* | 11/2014 | He ...................... | H04W 52/325 370/329 |

(Continued)

FOREIGN PATENT DOCUMENTS

| | | |
|---|---|---|
| CA | 2897744 | 8/2014 |
| WO | 2013174800 | 11/2013 |

OTHER PUBLICATIONS

RP-141664, Study on Licensed-Assisted Access using LTE, 3GPP TSG Ran Meeting #65, Edinburgh, Scotland, Sep. 9-12, 2014.

(Continued)

*Primary Examiner* — Yee Lam
(74) *Attorney, Agent, or Firm* — Fish & Richardson P.C.

(57) ABSTRACT

A channel sharing method includes determining a starting time for transmission on an LAA-LTE channel. A length of a hybrid preamble is determined based on the starting time and a predetermined transmission time boundary. Subsequent to determining the length of the hybrid preamble, the hybrid preamble having the determined length is transmitted. Subsequent to the hybrid preamble, a Long Term Evolution (LTE) signal is transmitted.

17 Claims, 21 Drawing Sheets

(56) References Cited

U.S. PATENT DOCUMENTS

| | | | | |
|---|---|---|---|---|
| 2016/0088642 A1* | 3/2016 | Yang | ................... | H04W 24/08 |
| | | | | 455/451 |
| 2016/0095110 A1* | 3/2016 | Li | ................... | H04W 72/0433 |
| | | | | 370/329 |
| 2016/0105897 A1* | 4/2016 | Liu | ................. | H04W 72/1226 |
| | | | | 370/235 |

OTHER PUBLICATIONS

ETSI EN 301 893, Broadband Radio Access Networks (BRAN); 5 GHz high performance RLAN; Harmonized EN covering the essential requirements of article 3.2 of the R&TTE Directive, V1.7.2 (Jul. 2014).

IEEE Std 802.11™—2012, Part 11: Wireless LAN Medium Access Control (MAC) and Physical Layer (PHY) Specifications.

Technical solution for LTE operation in 5GHz and its compatibility with the EC Decisions and ETSI regulations, I.A.E.S.I., 4GCelleX, Workshop on LTE in Unlicensed Bands, Paris, France, Jan. 21-22, 2014; 37 pages.

International Search Report and Written Opinion of the International Searching Authority issued in International Application No. PCT/CA2015/051184 on Feb. 5, 2016.

* cited by examiner

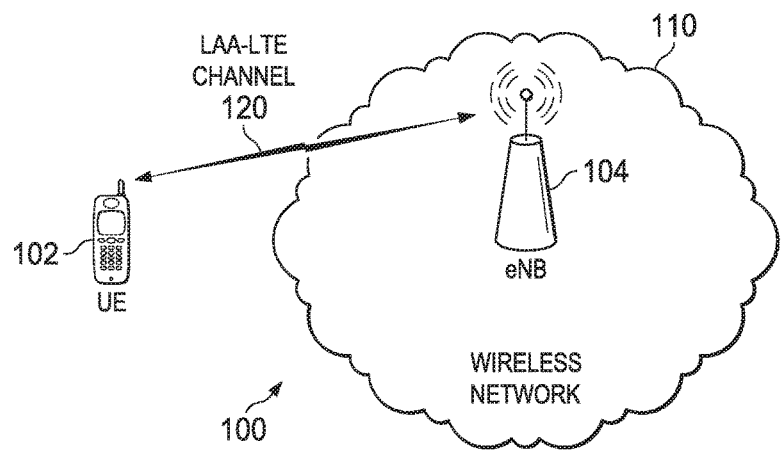
FIG. 1
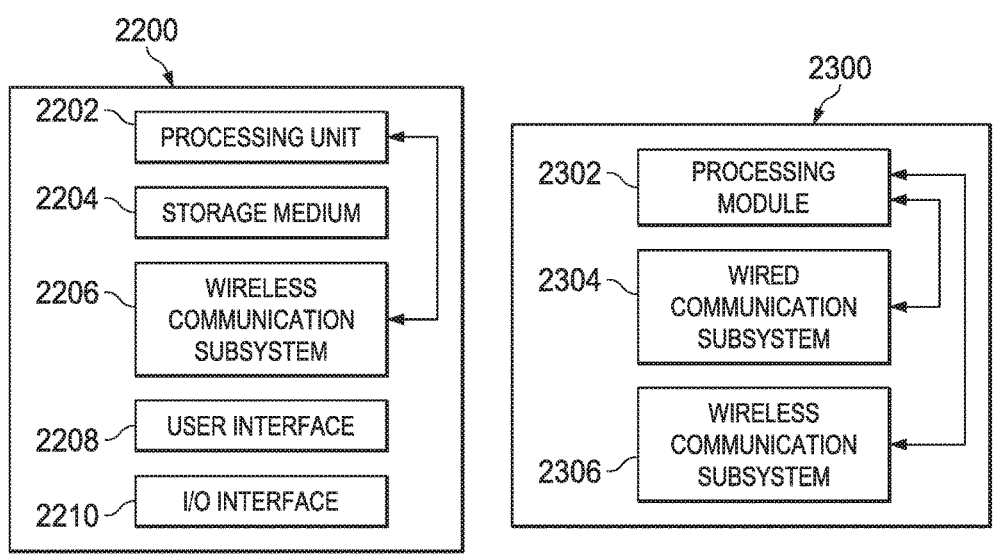
FIG. 22
FIG. 23

SHARING CHANNELS IN A LICENSED-ASSISTED ACCESS IN LONG TERM EVOLUTION OPERATION

TECHNICAL FIELD

This disclosure relates to data transmission in communication systems and, more specifically, to sharing channels in a licensed-assisted access in a Long Term Evolution (LAA-LTE) operation.

BACKGROUND

Operators have been looking at a number of ways to address the spectrum shortage issue and are increasingly looking towards the use of unlicensed spectrum as a solution. In some implementations, a Long Term Evolution (LTE) air-interface can be used in unlicensed spectrum. The general technology variant of LTE that can be used in unlicensed spectrum is referred to as licensed-assisted access in LTE (LAA-LTE). In some cases, LAA-LTE can use a licensed carrier as a primary cell (PCell) and an unlicensed carrier as a secondary cell (SCell). In some cases, cross-carrier scheduling can be used to schedule transmission on the unlicensed carrier. In a licensed-assisted operation, a transmission grant for a transmission on the unlicensed carrier can be transmitted on the licensed carrier.

DESCRIPTION OF DRAWINGS

FIG. 1 is an example wireless communication system that shares a channel in an LAA-LTE operation.

FIG. 22 is a block diagram illustrating an example user equipment (UE) device.

FIG. 23 is a block diagram illustrating an example evolved Node B (eNB) device.

Like reference numbers and designations in the various drawings indicate like elements.

DETAILED DESCRIPTION

Figure 2:
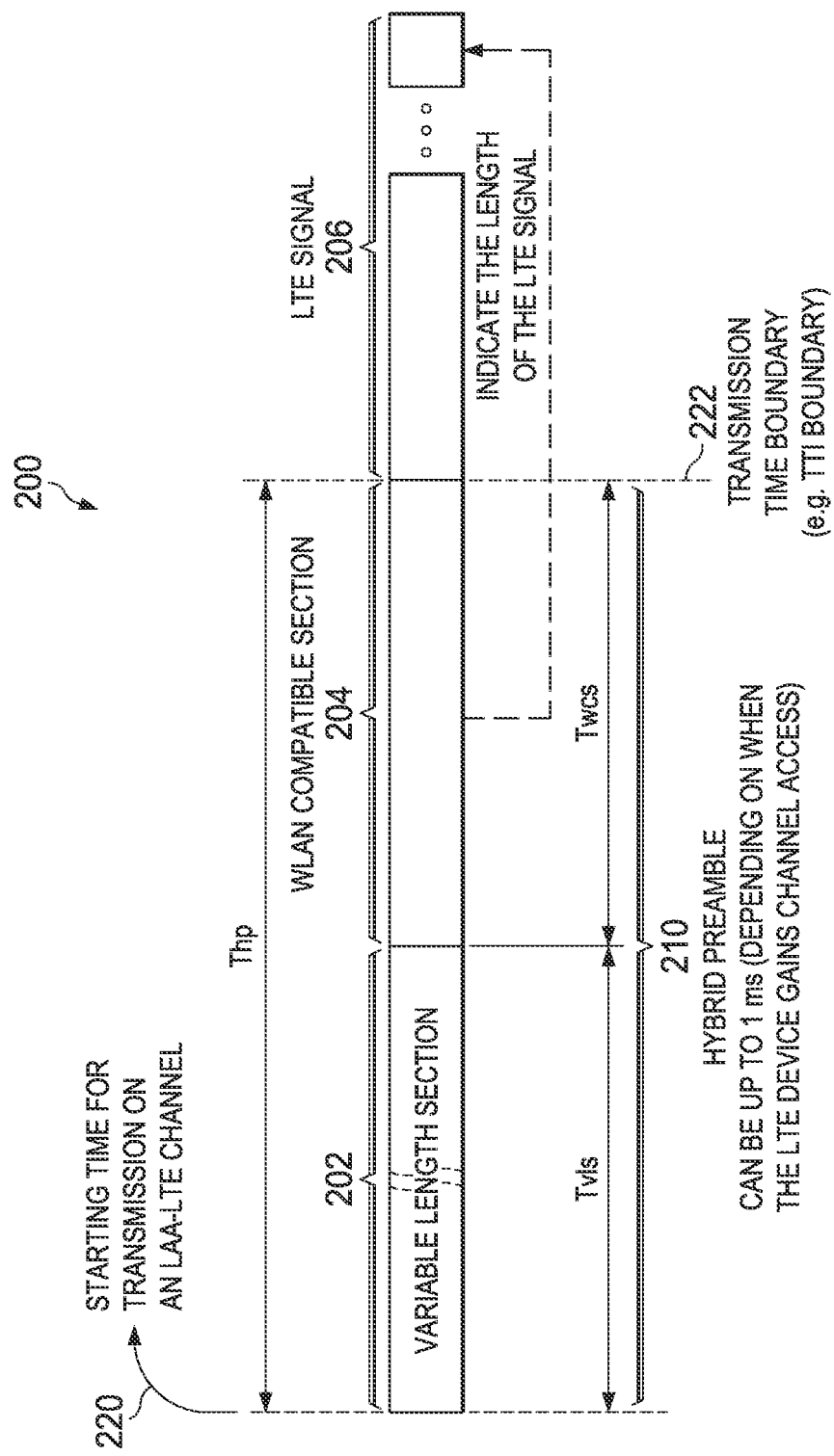
FIG. 2 is an example timing diagram illustrating a first hybrid preamble structure.

The present disclosure is directed to sharing channels in a licensed-assisted access in a Long Term Evolution (LAA-LTE) operation. An LAA-LTE operation can include a licensed carrier as a primary cell (PCell) and an unlicensed carrier as a secondary cell (SCell). In some cases, the unlicensed carrier in an LAA-LTE operation may be shared by a User Equipment (UE) that operates on LAA-LTE technology and Wireless Local Access Network (WLAN) devices that operate on WLAN technology. In one example, the WLAN technology may include an 802.11 air interface. In some cases, the WLAN devices may not recognize the waveform of a Long Term Evolution (LTE) signal that is transmitted on the unlicensed carrier. Therefore, the WLAN devices may treat the LTE signal as an unknown transmission. In some cases, the WLAN devices may be less sensitive in detecting unknown transmissions. Thus, the WLAN devices may attempt concurrent transmissions with the LTE signal on the unlicensed carrier, and thereby create higher chances of interference or crosstalk on the LTE signal. In addition, because the WLAN devices may not recognize the waveforms of the LTE signal, they may continue to monitor the unlicensed carrier until the completion of the LTE signal, and therefore increase power consumption of the WLAN devices.

Furthermore, in an LAA-LTE operation, the physical layer structure and frame format of the Long Term Evolution (LTE) air interface may be used to enable forward migration from LTE systems. This approach enables an LAA-LTE system to include many LTE features, e.g., Orthogonal Frequency Division Multiple Access (OFDMA), frequency domain scheduling, and cross-carrier scheduling.

In some implementations, a WLAN device may transmit a WLAN preamble prior to transmitting a WLAN signal on the unlicensed carrier. The WLAN preamble may indicate the length of the WLAN signal. Other WLAN devices may detect the WLAN preamble and determine the length of the WLAN signal accordingly. Other WLAN devices may thus save their battery power by stopping monitoring the unlicensed carrier and turning off part of their circuit components until the WLAN signal is transmitted. However, WLAN transmissions may not be compatible with the LTE frame structure because the WLAN operates on asynchronous channel access. For example, the WLAN preamble and the subsequent WLAN signal may be transmitted as soon as the unlicensed carrier is available. In contrast, the LTE frame structure, which supports both Frequency Division Duplex (FDD) and Time Division Duplex (TDD) operations, operates on a synchronous frame structure. Therefore, an LTE signal in an LAA-LTE operation may be transmitted on the unlicensed carrier at fixed transmission time boundaries. These fixed boundaries can be referred to as the Transmission Time Interval (TTI) boundaries. When an LAA-LTE equipment such as an eNB or a UE wants to transmit on an unlicensed carrier, the LAA-LTE equipment determines whether the channel is available for transmission (e.g. by listening to the channel and determining that the channel is unoccupied). However, at an instant when the unlicensed carrier is available to carry an LTE signal the UE or the eNB may not be able or permitted to transmit an LTE signal because the LTE signal transmission are specified to start at TTI boundaries and the instant for transmission on the unlicensed carrier does not coincide with a TTI boundary.

In some implementations, hybrid preambles may be used to share channels in an LAA-LTE operation. A hybrid preamble may indicate the length of an LTE signal that is transmitted on the unlicensed carrier, while maintaining compatibility with the LTE frame structure.

FIG. 1 is an example wireless communication system 100 that shares channels in a licensed-assisted access in Long Term Evolution (LAA-LTE) operation. For example, in a wireless communication system, a starting time for transmission on an LAA-LTE channel may be determined. In some implementations, the LAA-LTE channel is an unlicensed carrier that is configured for a licensed-assisted operation. In some cases, the determination may be performed by an evolved Node B (eNB) prior to a Downlink (DL) transmission by the eNB. Alternatively or in combination, the determination may be performed by a User Equipment (UE) prior to an Uplink (UL) transmission by the UE. A length of a hybrid preamble may be determined based on the starting time and a predetermined transmission time boundary. In some cases, the predetermined transmission time boundary is a Transmission Time Interval (TTI) boundary.

In some cases, the hybrid preamble may include a Wireless Local Area Network (WLAN) Compatible Section (WCS) that indicates a length of the LTE signal. In these cases, the length of the hybrid preamble may be equal to the duration of the Wireless Local Area Network (WLAN) Compatible Section (WCS). In some cases, the hybrid preamble may include a Wireless Local Area Network (WLAN) Compatible Section (WCS) and a Variable Length Section (VLS). The WCS may indicate a length of the LTE signal. The VLS may have a length that is determined based on a difference between the length of the hybrid preamble and a length of the WCS. In these cases, the length of the hybrid preamble may be larger than the length of the WCS. In some cases, the hybrid preamble includes a Variable Length Section (VLS) having a length that is determined based on the length of the hybrid preamble.

Subsequent to the determination of the length of the hybrid preamble, the hybrid preamble having the determined length may be transmitted. In some cases, the transmission may be a DL transmission that is transmitted by the eNB. Alternatively or in combination, the transmission may be a UL transmission that is transmitted by the UE. In some cases, prior to transmitting the hybrid preamble, a transmission grant that grants a transmission of the LTE signal and an indication that indicates a transmission power level of the hybrid preamble may be received. The indication may indicate that the hybrid preamble is transmitted at a normal power level or at a reduced power level. In these cases, the hybrid preamble may be transmitted in accordance with the indication.

In some implementations, the hybrid preamble is transmitted in a first subframe prior to the predetermined transmission time boundary, and the LTE signal is transmitted in a second subframe after the predetermined transmission time boundary. In some cases, the first subframe where the hybrid preamble is transmitted includes an LTE signal adapted to occupy only a subset of symbols in the first subframe. In these cases, the hybrid preamble is transmitted during a time period corresponding to symbols not within the subset. In some cases, the subset of symbols that are occupied in the first subframe are at the beginning of the subframe. In some other cases, the subset of the symbols that are occupied in the first subframe are at the end of the subframe.

Subsequent to the hybrid preamble, a Long Term Evolution (LTE) signal may be transmitted. In some implementations, a transmission grant that grants a transmission of a different LTE signal may be received. The transmission grant may include an indication to transmit the second LTE signal without a preceding hybrid preamble. In response to the indication, the second LTE signal may be transmitted without a preceding hybrid preamble.

Sharing a channel in an LAA-LTE operation according to methods and systems described herein may for example, enable WLAN devices via the hybrid preamble to detect LTE transmissions on an LAA-LTE channel and determine the length of the LTE transmissions. This approach enables the WLAN devices to save power because they can turn off part of their receiver circuit components until the LTE transmissions are completed. This approach may also mitigate interferences generated by WLAN devices during the LTE transmissions as the hybrid preamble can be detected by the WLAN devices at a lower signal level because of the presence of the known WLAN preambles in the hybrid preamble. Furthermore, this approach provides a hybrid preamble that is compatible to the existing LTE frame structure for both FDD and TDD operations. Therefore, the LAA-LTE operation can the reuse LTE features, such as Orthogonal Frequency Division Multiple Access (OFDMA) and cross-carrier scheduling.

At a high level, the example wireless communication system 100 includes a UE 102 and a wireless communication network 110, which includes an eNB 104 that is configured to communicate with the UE 102. In the illustrated example, the UE 102 may transmit an LTE signal to the eNB 104 on the LAA-LTE channel 120 in a UL transmission. The eNB 104 may transmit an LTE signal to the UE 102 on the LAA-LTE channel 120 in a DL transmission. In some instances, the LAA-LTE channel 120 may be an unlicensed carrier.

In a UL transmission, the UE 102 determines a starting time for transmitting on an LAA-LTE channel. The UE 102 determines a length of a hybrid preamble (to be transmitted by the UE before transmission of an LTE signal to the eNB) based on the starting time and a Transmission Time Interval (TTI) boundary. The UE 102 transmits, subsequent to determining the length of the hybrid preamble, the hybrid preamble having the determined length. Subsequent to the hybrid preamble, the UE 102 transmits a Long Term Evolution (LTE) signal.

In a DL transmission, the eNB 104 determines a starting time for transmitting on an LAA-LTE channel. The eNB 104 determines a length of a hybrid preamble (to be transmitted by the eNB before transmission of an LTE signal to the UE) based on the starting time and a Transmission Time Interval (TTI) boundary. The eNB 104 transmits, subsequent to determining the length of the hybrid preamble, the hybrid preamble having the determined length. Subsequent to the hybrid preamble, the eNB 104 transmits a Long Term Evolution (LTE) signal. FIGS. 2-23 and associated descriptions provide additional details of both UL and DL transmissions.

Turning to a general description of the elements, a UE may be referred to as mobile electronic device, user device, mobile station, subscriber station, portable electronic device, mobile communications device, wireless modem, or wireless terminal. Examples of a UE (e.g., the UE 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum.

Other examples of a UE include mobile and fixed electronic device. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 110 may include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one eNB 104. An eNB 104 may be a radio base station that may control all or at least some radio-related functions in a fixed part of the system. The eNB 104 may provide radio interface within their coverage area or a cell for the UE 102 to communicate. The eNB 104 may be distributed throughout the cellular network to provide a wide area of coverage. The eNB 104 directly communicates to one or a plurality of UEs, other base stations, and one or more core network nodes.

While described in terms of FIG. 1, the present disclosure is not limited to such an environment. The eNB 104 may operate on any of the different wireless communication technologies. Example wireless technologies include Global System for Mobile Communication (GSM), Universal Mobile Telecommunications System (UMTS), 3GPP Long Term Evolution (LTE), LTE-Advanced (LTE-A), wireless broadband communication technologies, and others. Example wireless broadband communication system includes IEEE 802.11 wireless local area network, IEEE 802.16 WiMAX network, and others.

While elements of FIG. 1 are shown in FIGS. 22 and 23 as including various component parts, portions or modules that implement the various features and functionality, nevertheless these elements may instead include a number of sub-modules, third-party services, components, libraries, and such, as appropriate. Furthermore, the features and functionality of various components can be combined into fewer components as appropriate.

FIG. 2 is an example timing diagram 200 illustrating a first hybrid preamble structure. The example timing diagram 200 includes a hybrid preamble 210 and an LTE signal 206. The hybrid preamble 210 begins at a starting time 220, which is the time at which the transmitting entity, e.g., the UE for UL or the eNB for DL, determines that transmission on the unlicensed carrier is allowed. In operation, WLAN devices may detect the transmission of the hybrid preamble 210 and recognize that the channel is occupied. The hybrid preamble 210 ends at a TTI boundary 222. The LTE signal 206 begins after transmission of the hybrid preamble 210 at the TTI boundary 222. Therefore, the transmission of the LTE signal 206 is compatible with the LTE frame structure.

In the illustrated example, the hybrid preamble 210 includes a Variable Length Section (VLS) 202 and a WLAN Compatible Section (WCS) 204. In the illustrated example, the VLS 202 is transmitted prior to the WCS 204 although the VLS and WCS may be reversed as will be described hereinafter. The WCS 204 may be formatted in accordance with signals transmitted by WLAN devices and, therefore, the WCS 204 may be detected and decoded by WLAN devices. The WCS 204 may include an indication of the duration of the LTE signal which is to be transmitted following the hybrid preamble 210. Therefore, the WLAN devices may be informed of or otherwise determine the length of time for which the channel will be occupied and turn off their circuits to save battery power.

In some implementations, the WCS 204 has a length that is specified according to WLAN technologies. This length is denoted as $T_{WCS}$ in the illustrated example. The length of the hybrid preamble 210 is denoted as $T_{HP}$, which begins at the starting time 220 and ends at the TTI boundary 222. In the illustrated example, the length of the hybrid preamble 210 is greater than the length of the WCS 204, and therefore, a VLS, i.e., the VLS 202, is included in the hybrid preamble 210. The VLS 202 may be used to occupy the channel. In some cases, the starting time 220 may occur at any time, while the TTI boundary 222 occurs at a fixed time boundary. Therefore, the length of the hybrid preamble 210 may vary. Because the length of the WCS 204 is fixed, the length of the VLS 202, denoted as $T_{VLS}$, may also vary. In some cases, the length of the VLS 202 may be the difference of the length of the hybrid preamble 210 and the length of the WCS 204. In some cases, the length of the VLS 202 may be reduced by the length of any gap in transmission in the VLS 202. The gap may be small enough so that WLAN devices may not occupy the medium during the gap. For example, the gap may be less than a Short Inter Frame Spacing (SIFS) in WLAN technologies. In some case, the SIFS may be about 10 μsec for 802.11n at 2.5 GHz, or about 16 μsec for 802.11a and 802.11c. This approach may simplify implementation of the transmitter when transitioning between the VLS 202 and the WCS 204. Additionally, this approach may increase the probability that WLAN devices monitoring the channel may correctly decode the WCS 204 because the gap may function similarly to an idle period in a WLAN transmission.

In some cases, the VLS 202 may include a known preamble sequence. Examples of the known preamble sequence may include cell-specific reference signals in downlink, sounding reference signal sequence in uplink, WLAN-specific preambles such as Short Training Field (L-STF) or Long Training Field (L-LTF), or other preamble sequences. In some cases, the known preamble sequences may be repeated a number of times to construct the VLS of the desired length. Known preamble section sequences may be used by the receiving LAA-LTE devices for channel estimation purposes. In some implementations, a receiver may calculate the length of the VLS based on the starting time of the VLS, the next TTI boundary, and the length of the WCS.

Figure 3:
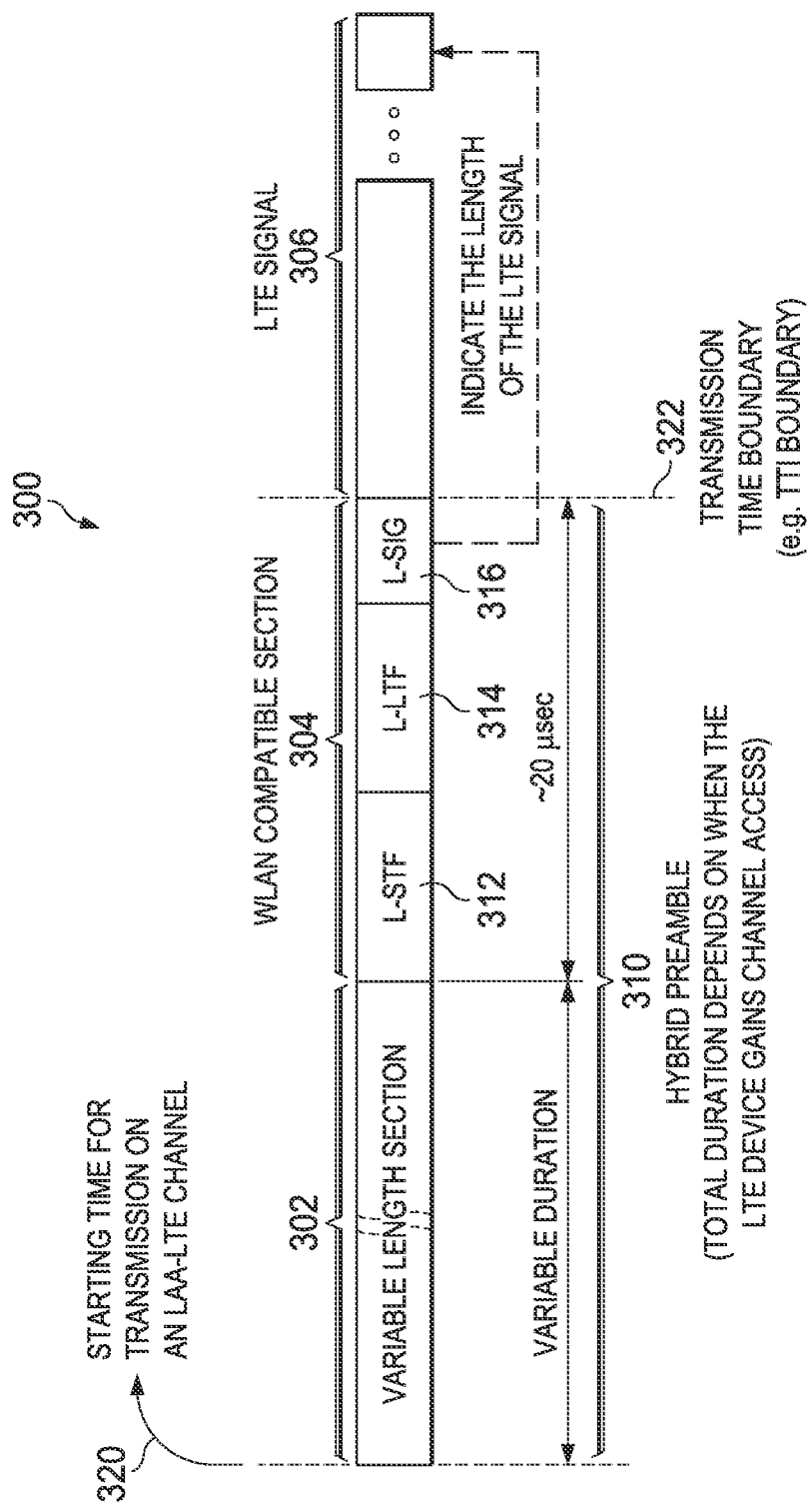
FIG. 3 is an example timing diagram illustrating a length indication using a Signaling Field (L-SIG) in the first hybrid preamble structure.

FIG. 3 is an example timing diagram 300 illustrating a length indication using a Signaling Field (L-SIG) in the first hybrid preamble structure. The example timing diagram 300 includes a hybrid preamble 310 and an LTE signal 306. The hybrid preamble 310 begins at a starting time 320, which is the time at which the transmitting entity, e.g., the UE for UL or the eNB for DL, determines that transmission on the unlicensed carrier is allowed. In operation, WLAN devices may detect the transmission of the hybrid preamble 310 and recognize that the channel is occupied. The hybrid preamble 310 ends at a first side of a TTI boundary 322. The LTE signal 306 begins at another, adjacent side the TTI boundary 322. Therefore, the transmission of the LTE signal 306 is compatible with the LTE frame structure. In the illustrated example, the hybrid preamble 310 includes a VLS 302 and a WCS 304. In the illustrated example, the VLS 302 is transmitted prior to the WCS 304.

In the illustrated example, the WCS 304 includes an L-STF 312, an L-LTF 314, and an L-SIG 316. The L-STF 312, the L-LTF 314, and the L-SIG 316 are legacy fields that can be detected by WLAN devices. In some implementations, the L-STF 312 and the L-LTF 314 are known preambles to some WLAN devices, e.g., devices that operate on 802.11n technologies. In some implementations, WLAN devices can also detect the signal, perform frequency offset estimation, or timing synchronization by detecting the L-STF 312 and the L-LTF 314. Because the L-STF 312 and the L-LTF 314 are known preambles to some WLAN devices, these WLAN devices may detect the transmission on the medium at a lower signal level. In some instances, the L-SIG 316 may include information that indicates the length of the LTE signal 306 which is to be transmitted after the hybrid preamble 310. In some implementations, the length of the LTE signal may be fixed, e.g., specified in a standard. In some implementations, the length of the LTE signal may be varied and determined by the transmitting node (i.e., eNB in DL and UE in UL). Alternatively, the length of the LTE signal may be determined by the eNB regardless of the direction of transmission, i.e., for both DL and UL transmission and this is signaled to the UE.

In some implementations, the L-SIG 316 can be set in bytes assuming transmission at the rate of 6 Mbps. For example, the L-SIG 316 can be set based on the following equation:

$$L\text{-}SIG = n \times [1\ ms \times 6\ mbps] = (n \times 750)\ bytes,$$

where n indicates the number of consecutive TTI that may be included in the LTE signal 306.

In some cases, a maximum value of n (i.e. $N_{max}$) may be determined based on regulatory requirements.

Figure 4:
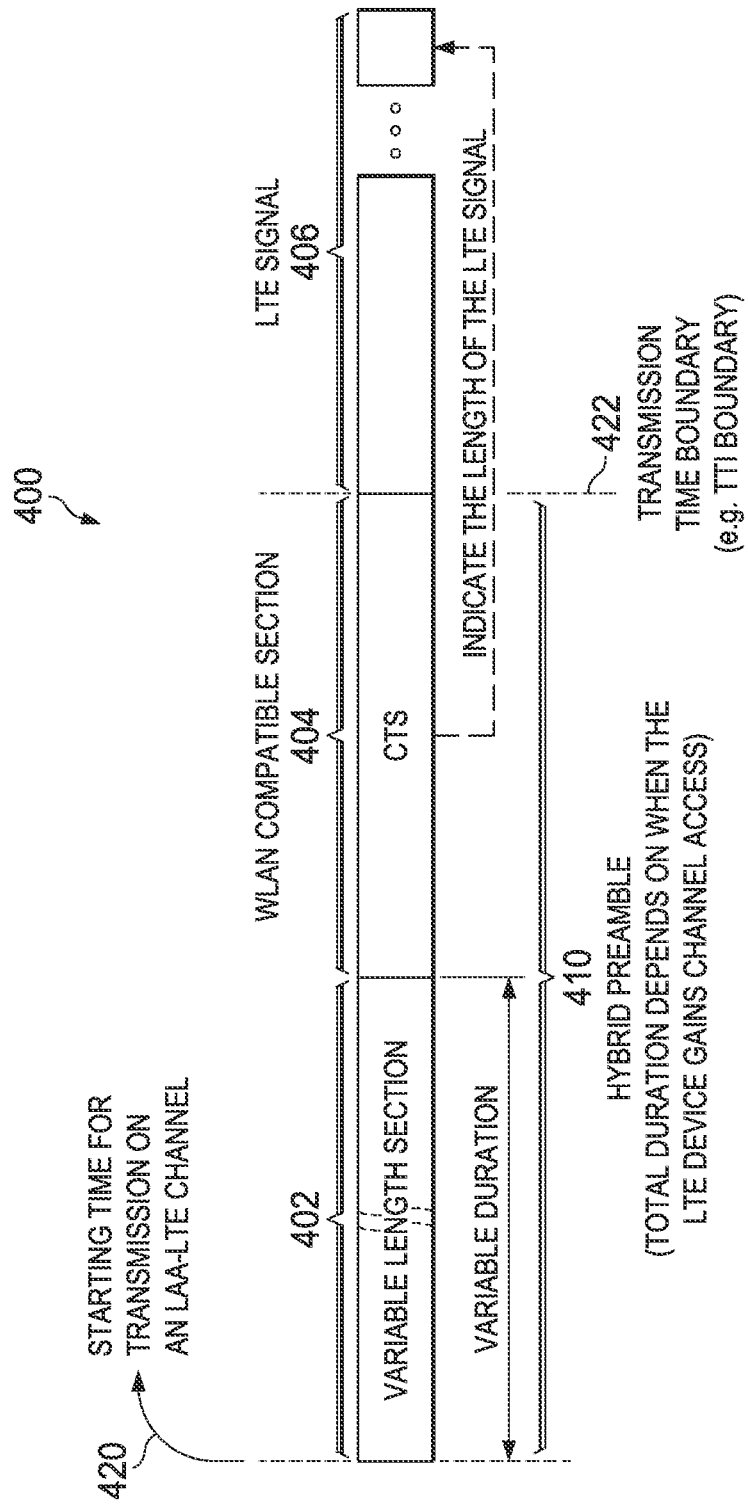
FIG. 4 is an example timing diagram illustrating a length indication using a Clear to Send (CTS) message in the first hybrid preamble structure.

FIG. 4 is an example timing diagram 400 illustrating a length indication using a Clear to Send (CTS) message in the first hybrid preamble structure. The example timing diagram 400 includes a hybrid preamble 410 and an LTE signal 406. The hybrid preamble 410 begins at a starting time 420, which is the time at which the transmitting entity, e.g., the UE for UL or the eNB for DL, determines that transmission on the unlicensed carrier is allowed. In operation, WLAN devices may detect the transmission of the hybrid preamble 410 and recognize that the channel is occupied. The hybrid preamble 410 ends at one side of a TTI boundary 422. The LTE signal 406 begins at the other side of the TTI boundary 422. Therefore, the transmission of the LTE signal 406 is compatible with the LTE frame structure. In the illustrated example, the hybrid preamble 410 includes a VLS 402 and a WCS 404. In the illustrated example, the VLS 402 is transmitted prior to the WCS 404.

In the illustrated example, the WCS 404 includes a CTS message. A CTS message may include a duration that indicates the length of the LTE signal 406 which is to be transmitted after the hybrid preamble 410. The duration may be set in a similar manner as the L-SIG field. In some implementations, WLAN devices may use the duration field in the CTS message to perform virtual carrier sensing mechanism and to update the Network Allocation Vector (NAV). The duration indicates that the medium is likely to be busy during the period of time as indicated and, therefore, the WLAN devices may turn off part of their circuit components until the end of the duration. In some implementations, the WCS 404 may include a Request to Send (RTS) message that also includes a duration field.

Figure 5:
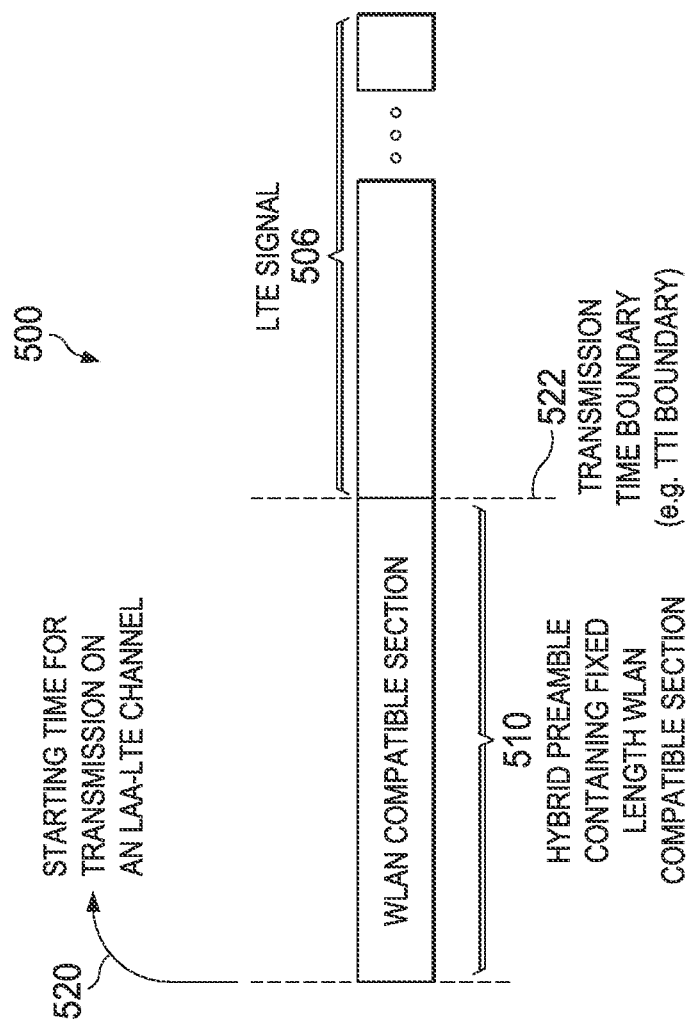
FIG. 5 is an example timing diagram illustrating a first hybrid preamble structure without a Variable Length Section (VLS).
Figure 6:
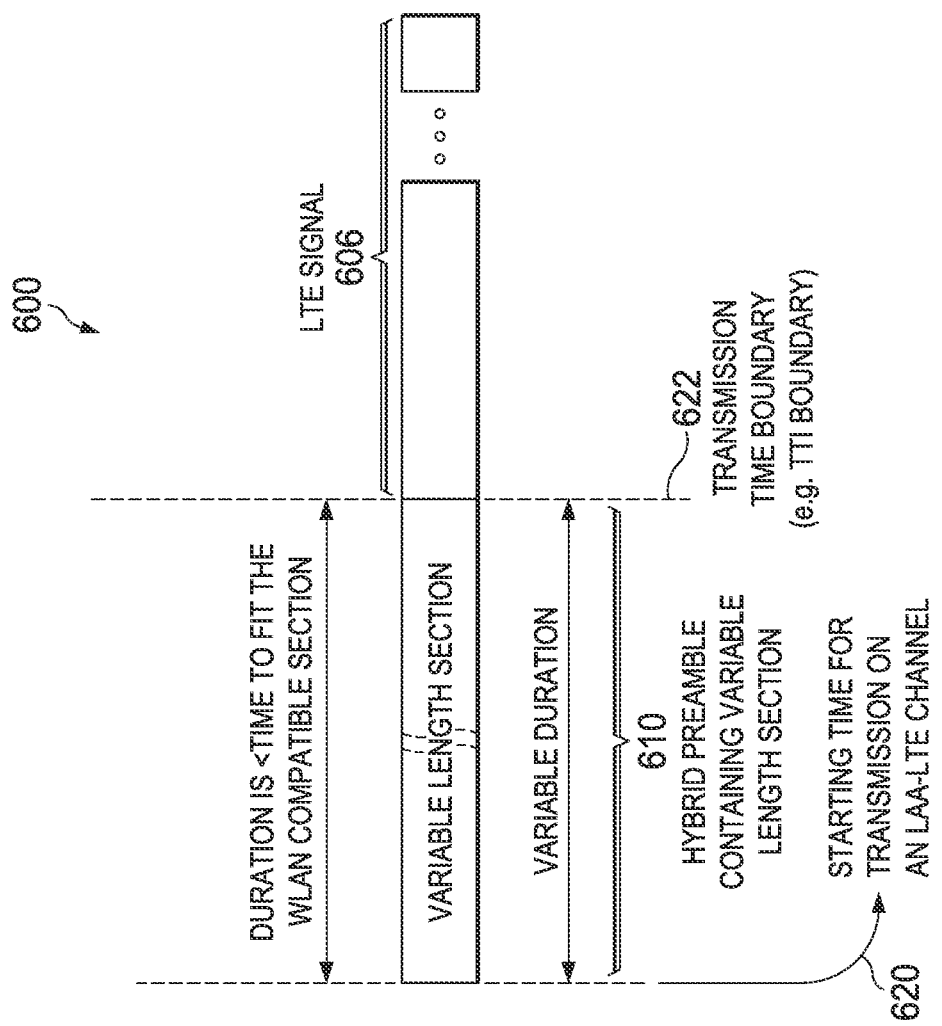
FIG. 6 is an example timing diagram illustrating a first hybrid preamble structure without a Wireless Local Area Network (WLAN) Compatible Section (WCS).

FIG. 5 is an example timing diagram 500 illustrating a first hybrid preamble structure without a Variable Length Section (VLS). Such a hybrid preamble may be constructed when a time to reach the TTI boundary is substantially equal to a duration of the WCS. The example timing diagram 500 includes a hybrid preamble 510 and an LTE signal 506. The hybrid preamble 510 begins at a starting time 520, which is the time at which the transmitting entity, e.g., the UE for UL or the eNB for DL, determines that transmission on the unlicensed carrier is allowed. In operation, WLAN devices may detect the transmission of the hybrid preamble 510 and recognize that the channel is occupied. The hybrid preamble 510 ends at a TTI boundary 522. The LTE signal 506 begins at the TTI boundary 522. Therefore, the transmission of the LTE signal 506 is compatible with the LTE frame structure. In the illustrated example, the hybrid preamble 510 includes a WCS, but not a VLS. The length of the hybrid preamble 510 is equal to the fixed length of the WCS FIG. 6 is an example timing diagram 600 illustrating a first hybrid preamble structure without a WCS. The example timing diagram 600 includes a hybrid preamble 610 and an LTE signal 606. The hybrid preamble 610 begins at a starting time 620, which is the time at which the transmitting entity, e.g., the UE for UL or the eNB for DL, determines that transmission on the unlicensed carrier is allowed. In operation, WLAN devices may detect the transmission of the hybrid preamble 610 and recognize that the channel is occupied. The hybrid preamble 610 ends at a TTI boundary 622. The LTE signal 606 begins at the TTI boundary 622. Therefore, the transmission of the LTE signal 606 is compatible with the LTE frame structure. In the illustrated example, the length of the hybrid preamble 610 is smaller than the fixed length of a WCS. In the illustrated example, the hybrid preamble 610 includes a VLS, but not a WCS. In this case, the length of the VLS is the same as the length of the hybrid preamble 610. This scenario may occur when the transmitting entity determines that the fixed WCS cannot be included in the hybrid preamble because the WCS has a longer duration in comparison to a time between the next TTI boundary (622) and the current instant (620) that a transmission may commence. In one instance such a hybrid preamble may be constructed without WCS when, for example, the transmitting entity wants to transmit an LTE signal without having to wait for the next TTI boundary. Accordingly the hybrid preamble may be transmitted without WCS to reserve the channel by preventing WLAN device from transmitting thereon since the VLS may include a known WLAN-specific preamble such as Short Training Field (L-STF) or Long Training Field (L-LTF), or other preamble sequences. Furthermore, the known preamble sequences may be repeated a number of times to construct the VLS of the desired length until the TTI boundary is reached.

Figure 7:
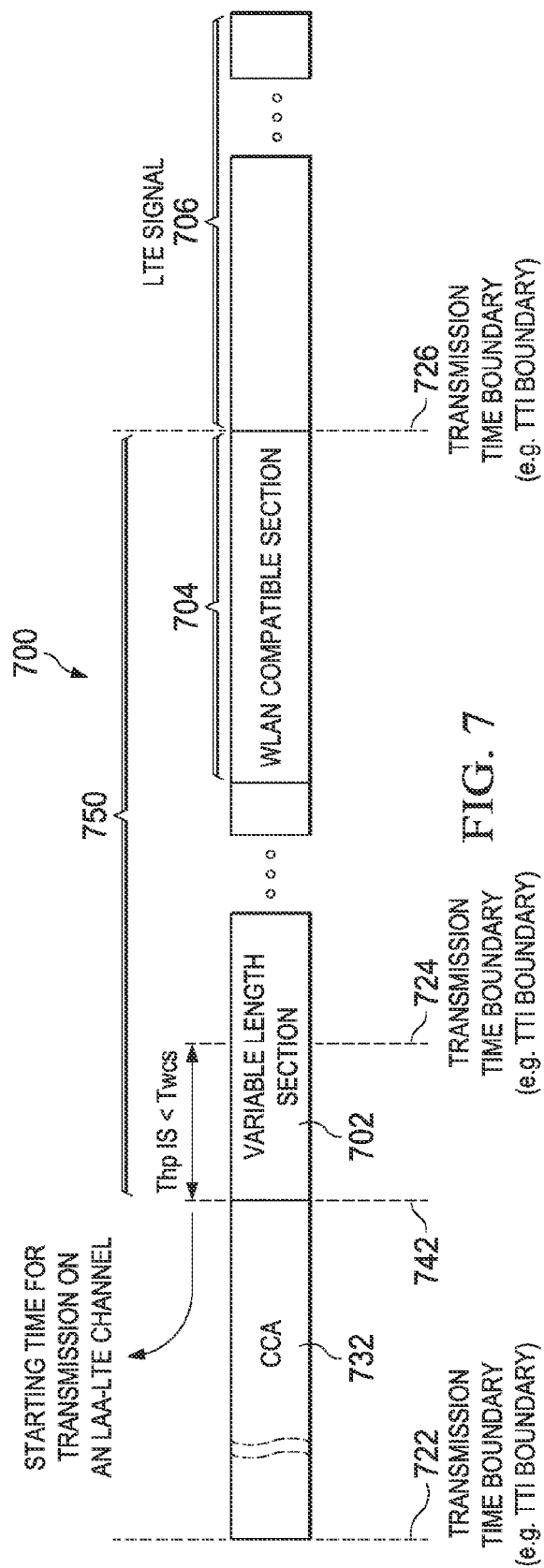
FIG. 7 is an example timing diagram illustrating an extended first hybrid preamble structure.

FIG. 7 is an example timing diagram 700 illustrating an extended first hybrid preamble structure. The example timing diagram 700 includes TTI boundaries 722, 724, and 726. The timing diagram 700 includes a clear channel assessment (CCA) period 732, where the channel is sensed to determine whether the channel is available for carrying a transmission. In some implementations, the channel may be sensed by the e.g., the eNB for DL or the UE or UL. In some cases, the transmitting entity may estimate the energy of the channel to sense whether the channel is available. The timing diagram 700 also includes a hybrid preamble 750 and an LTE signal 706. The hybrid preamble 750 begins at a starting time 742, when the channel is determined to be available for transmission. In the illustrated example, the time between the starting time 742 and the next TTI boundary 724 is smaller than a duration of a WCS. In the illustrated example, the hybrid preamble 750 extends to the following TTI boundary 726. In the illustrated example, the hybrid preamble 750 includes a WCS 704 and a VLS 702. In the illustrated example, the VLS 702 is transmitted prior to the WCS 704.

In some implementations, a second hybrid preamble structure may be used. In the second hybrid preamble structure, a WCS is transmitted before a VLS rather than vice-versa (i.e. VLS before WCS) as described with regard to FIGS. 2-7. FIGS. 8-13 and associated descriptions provide additional details of these implementations.

Figure 8:
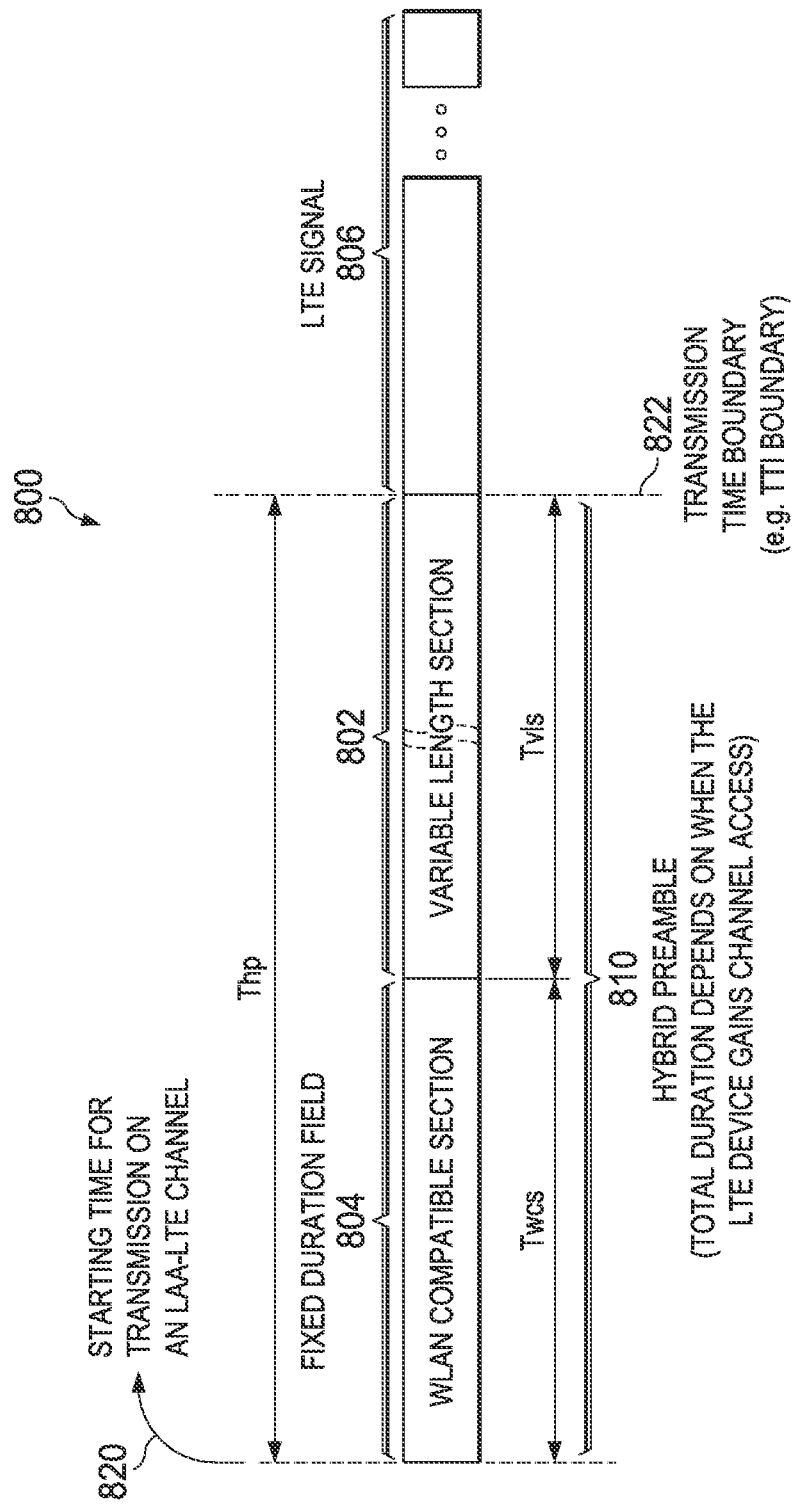
FIG. 8 is an example timing diagram illustrating a second hybrid preamble structure.

FIG. 8 is an example timing diagram 800 illustrating a second hybrid preamble structure. The example timing diagram 800 includes a hybrid preamble 810 and an LTE signal 806. The hybrid preamble 810 begins at a starting time 820, which is the time at which the transmitting entity, e.g., the UE for UL or the eNB for DL, determines that transmission on the unlicensed carrier is allowed. In operation, WLAN devices may detect the transmission of the hybrid preamble 810 and recognize that the channel is occupied. The hybrid preamble 810 ends at a TTI boundary 822. The LTE signal 806 begins at the TTI boundary 822. Therefore, the transmission of the LTE signal 806 is compatible with the LTE frame structure. In the illustrated example, the hybrid preamble 810 includes a VLS 802 and a WCS 804. In the illustrated example, the VLS 802 is transmitted after the WCS 804. The WCS 804 may be formatted in accordance with signals transmitted by WLAN devices and, therefore, the WCS 804 may be detected and decoded by WLAN devices. The WCS 804 may include an indication of the duration of the LTE signal. Therefore, the WLAN devices may determine the length of time for which the channel will be occupied and turn off their circuits to save battery power. As described previously, the length of the VLS 802 may be determined based on the length of the hybrid preamble 810 and the length of the WCS 804. In some cases, the VLS 802 may include a known preamble sequence.

Figure 9:
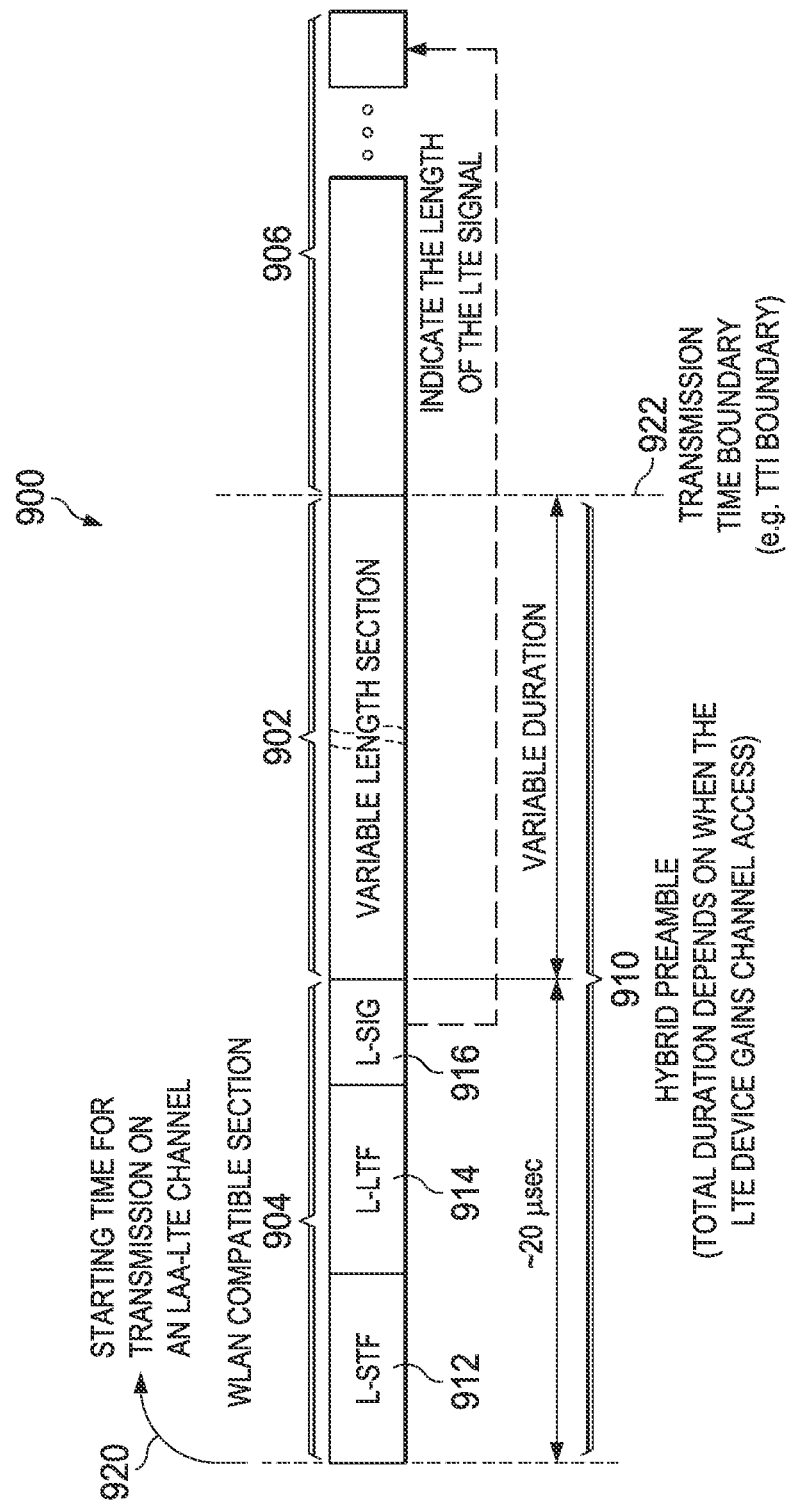
FIG. 9 is an example timing diagram illustrating a length indication using a Signaling Field (L-SIG) in the second hybrid preamble structure.

FIG. 9 is an example timing diagram 900 illustrating a length indication using a Signaling Field (L-SIG) in the second hybrid preamble structure. The example timing diagram 900 includes a hybrid preamble 910 and an LTE signal 906. The hybrid preamble 910 begins at a starting time 920, which is the time at which the transmitting entity, e.g., the UE for UL or the eNB for DL, determines that transmission on the unlicensed carrier is allowed. In operation, WLAN devices may detect the transmission of the hybrid preamble 910 and recognize that the channel is occupied. The hybrid preamble 910 ends at a TTI boundary 922. The LTE signal 906 begins at the TTI boundary 922. Therefore, the transmission of the LTE signal 906 is compatible with the LTE frame structure. In the illustrated example, the hybrid preamble 910 includes a VLS 902 and a WCS 904. In the illustrated example, the VLS 902 is transmitted after the WCS 904. In the illustrated example, the WCS 904 includes an L-STF 912, an L-LTF 914, and an L-SIG 916. In some implementations, the L-STF 912 and the L-LTF 914 are known preambles to some WLAN devices. In some instances, the L-SIG 916 may include information that indicates the length of the LTE signal 906.

Figure 10:
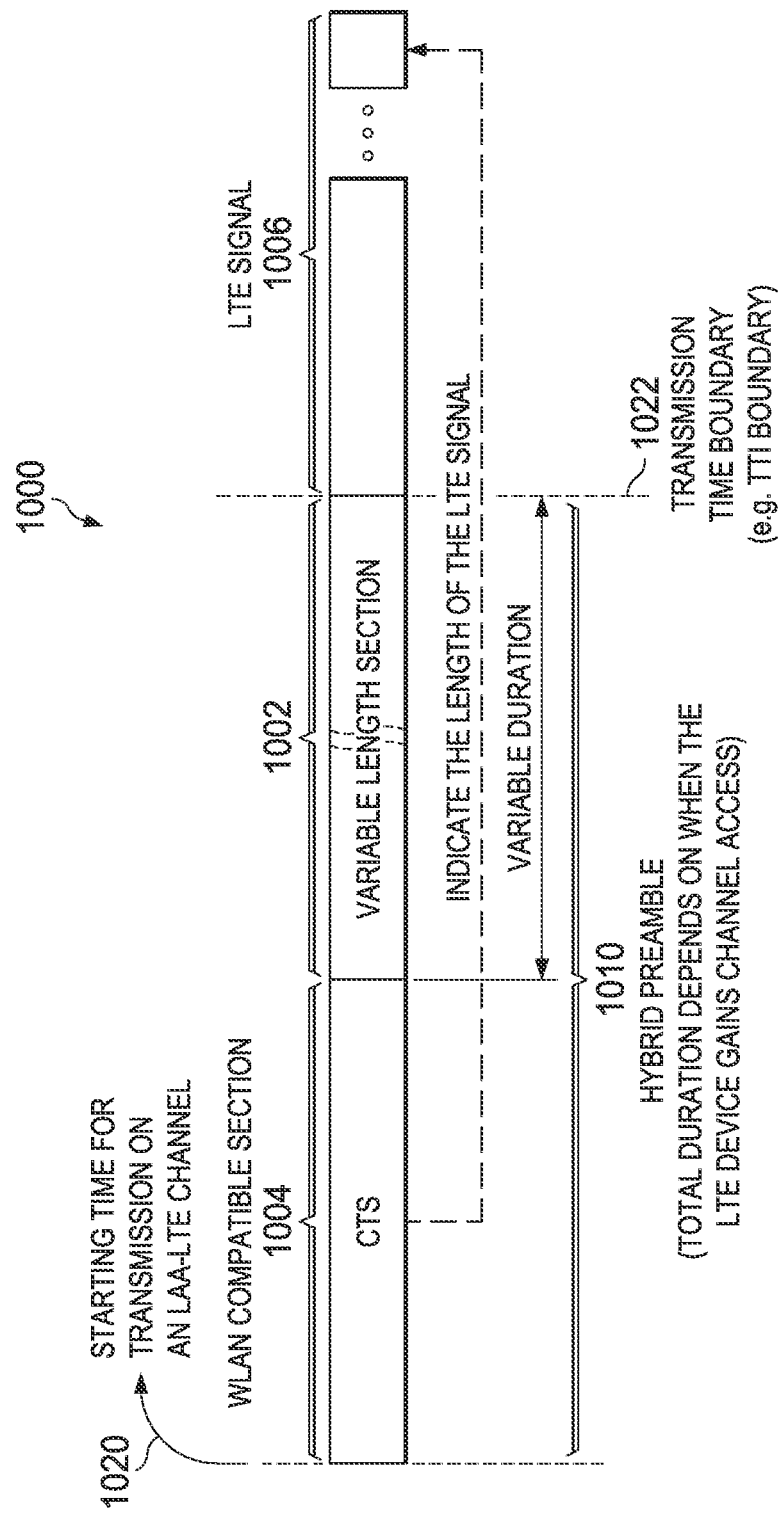
FIG. 10 is an example timing diagram illustrating a length indication using a Clear to Send (CTS) message in the second hybrid preamble structure.

FIG. 10 is an example timing diagram 1000 illustrating a length indication using a using a Clear to Send (CTS) message in the second hybrid preamble structure. The example timing diagram 1000 includes a hybrid preamble 1010 and an LTE signal 1006. The hybrid preamble 1010 begins at a starting time 1020, which is the time at which the transmitting entity, e.g., the UE for UL or the eNB for DL, determines that transmission on the unlicensed carrier is allowed. In operation, WLAN devices may detect the transmission of the hybrid preamble 1010 and recognize that the channel is occupied. The hybrid preamble 1010 ends at a TTI boundary 1022. The LTE signal 1006 begins at the TTI boundary 1022. Therefore, the transmission of the LTE signal 1006 is compatible with the LTE frame structure. In the illustrated example, the hybrid preamble 1010 includes a VLS 1002 and a WCS 1004. In the illustrated example, the VLS 1002 is transmitted after the WCS 1004. In the illustrated example, the WCS 1004 includes a CTS message. A CTS message may include a duration that indicates the length of the LTE signal 1006. The duration may be set in a similar manner as the L-SIG field.

Figure 11:
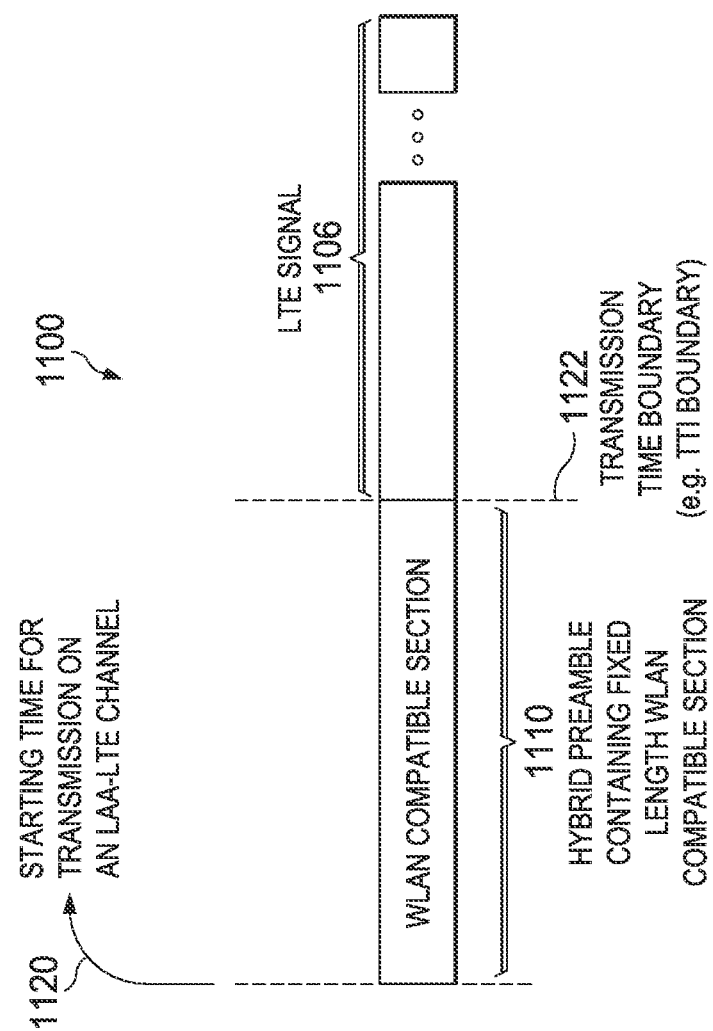
FIG. 11 is an example timing diagram illustrating a second hybrid preamble structure without a Variable Length Section (VLS).

FIG. 11 is an example timing diagram 1100 illustrating a second hybrid preamble structure without a Variable Length Section (VLS). The example timing diagram 1100 includes a hybrid preamble 1110 and an LTE signal 1106. The hybrid preamble 1110 begins at a starting time 1120, which is the time at which the transmitting entity, e.g., the UE for UL or the eNB for DL, determines that transmission on the unlicensed carrier is allowed. In operation, WLAN devices may detect the transmission of the hybrid preamble 1110 and recognize that the channel is occupied. The hybrid preamble 1110 ends at a TTI boundary 1122. The LTE signal 1106 begins at the TTI boundary 1122. Therefore, the transmission of the LTE signal 1106 is compatible with the LTE frame structure. In the illustrated example, the length of the hybrid preamble 1110 is equal to the fixed length of a WCS. Therefore, the hybrid preamble 1110 includes a WCS, but not a VLS.

Figure 12:
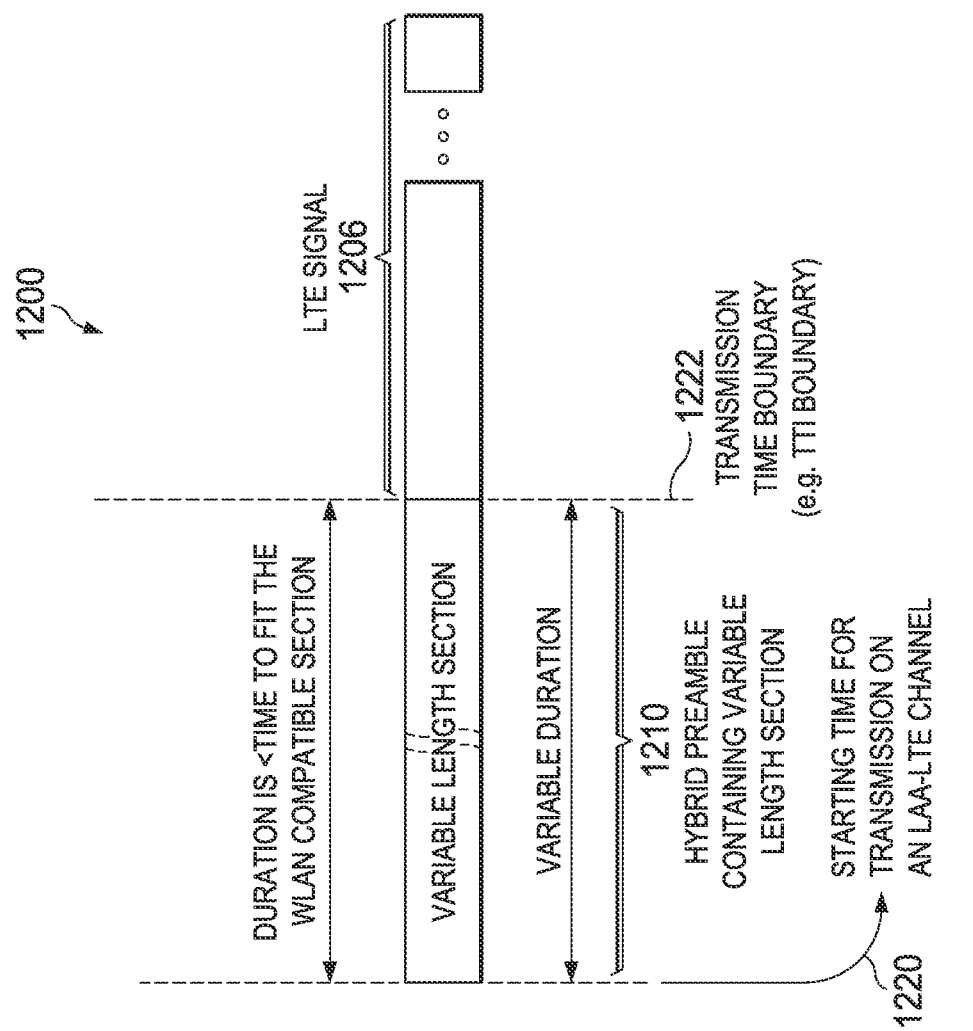
FIG. 12 is an example timing diagram illustrating a second hybrid preamble structure without a Wireless Local Area Network (WLAN) Compatible Section (WCS).

FIG. 12 is an example timing diagram 1200 illustrating a second hybrid preamble structure without a WCS. The example timing diagram 1200 includes a hybrid preamble 1210 and an LTE signal 1206. The hybrid preamble 1210 begins at a starting time 1220, which is the time at which the transmitting entity, e.g., the UE for UL or the eNB for DL, determines that transmission on the unlicensed carrier is allowed. In operation, WLAN devices may detect the transmission of the hybrid preamble 1210 and recognize that the channel is occupied. The hybrid preamble 1210 ends at a TTI boundary 1222. The LTE signal 1206 begins at the TTI boundary 1222. Therefore, the transmission of the LTE signal 1206 is compatible with the LTE frame structure. In the illustrated example, the length of the hybrid preamble 1210 is smaller than the fixed length of a WCS. In the illustrated example, the hybrid preamble 1210 includes a VLS, but not a WCS. In this case, the length of the VLS is the same as the length of the hybrid preamble 1210.

Figure 13:
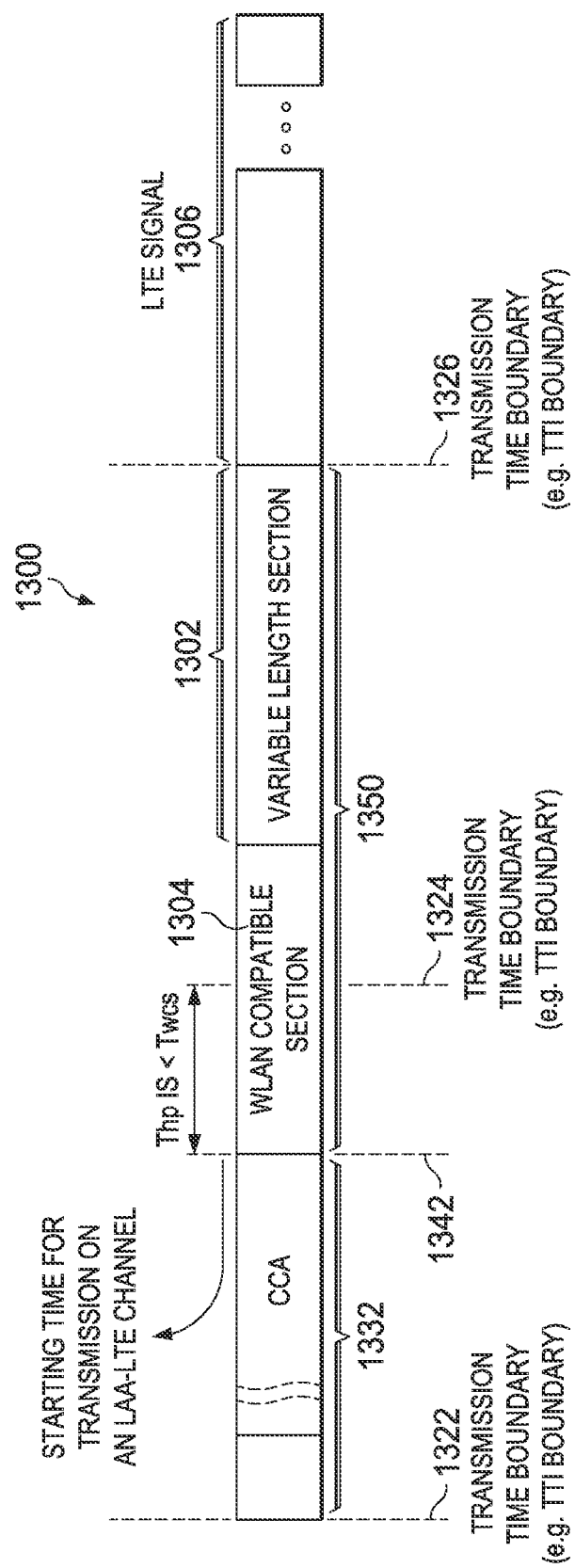
FIG. 13 is an example timing diagram illustrating an extended second hybrid preamble structure.

FIG. 13 is an example timing diagram 1300 illustrating an extended second hybrid preamble structure. The example timing diagram 1300 includes TTI boundaries 1322, 1324, and 1326. The timing diagram 1300 includes a clear channel assessment (CCA) period 1332, where channel is sensed to determine whether the channel is available. The timing diagram 1300 also includes a hybrid preamble 1350 and an LTE signal 1306. The hybrid preamble 1310 begins at a starting time 1342, when the channel is available for access. In the illustrated example, the time between the starting time 1342 and the next TTI boundary 1324 is smaller than a duration of a WCS. In the illustrated example, the hybrid preamble 1350 extends to the following TTI boundary 1326. In the illustrated example, the hybrid preamble 1350 includes a WCS 1304 and a VLS 1302. In the illustrated example, the VLS 1302 is transmitted after the WCS 1304.

In general, a hybrid preamble comprises either a VLS or a WCS or both. When both VLS and WCS are included in the hybrid preamble, then they may be transmitted in either order (i.e. WCS before VLS or VLS before WCS). The WCS may comprise any signal that is compatible with WLAN and may include an indication of length of the LTE signal that follows the HP. The WCS may comprise a CTS or an RTS signal or a combination of L-STF, L-LTF and L-SIG fields. The transmitting node transmits the hybrid preamble until the TTI boundary is reached, followed by the LTE signal.

Figure 14:
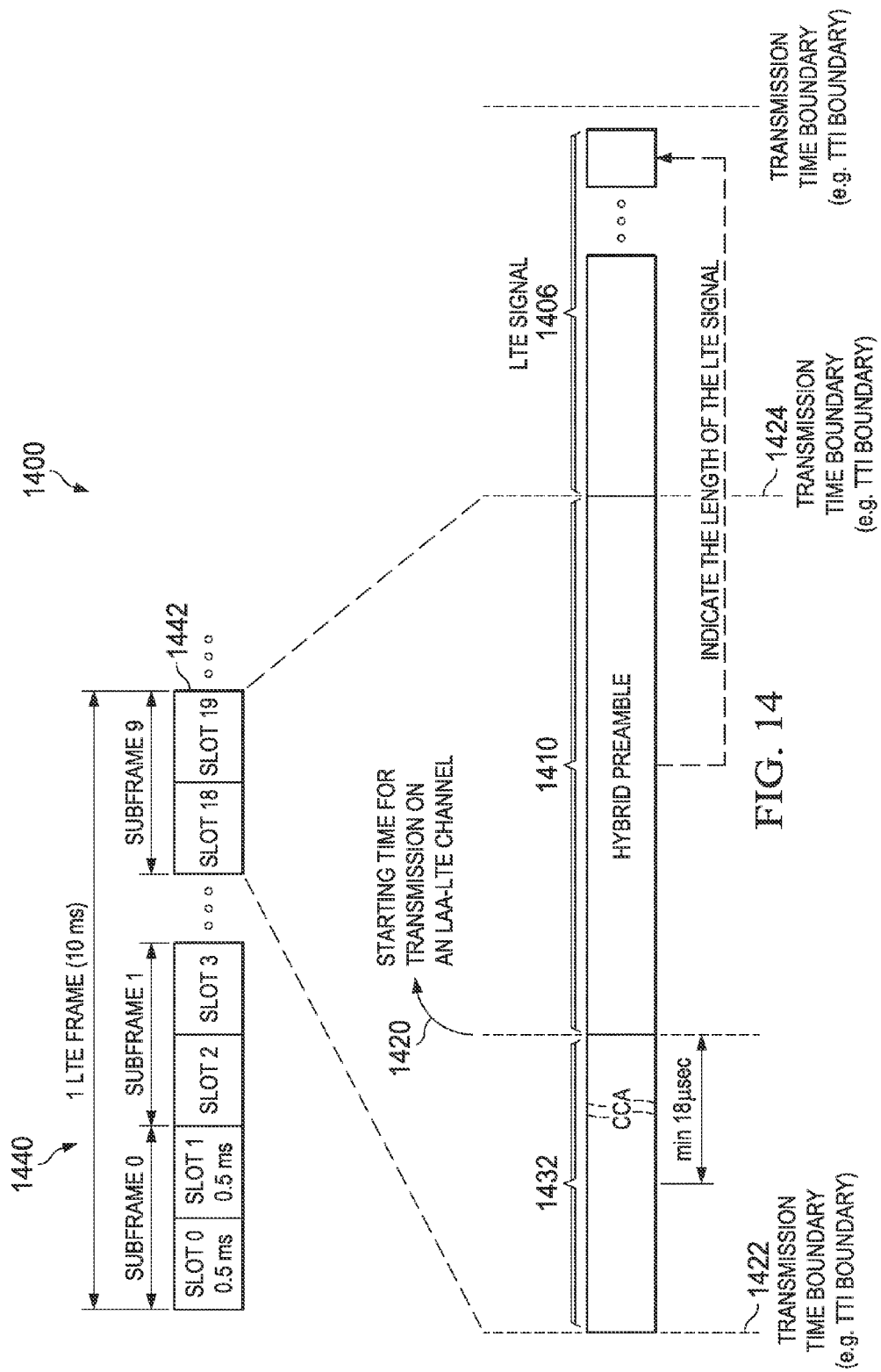
FIG. 14 is an example timing diagram illustrating a Downlink (DL) hybrid preamble structure in a Load Based Equipment (LBE) operation.

FIG. 14 is an example timing diagram 1400 illustrating a Downlink (DL) hybrid preamble structure in a Load Based Equipment (LBE) operation. The illustrated hybrid preamble may be used in either a TDD system or an FDD system. The timing diagram 1400 includes an LTE frame 1440, which includes a subframe 1442. The timing diagram 1400 also includes a CCA period 1432, a hybrid preamble 1410, and an LTE signal 1406. In addition, the timing diagram 1400 includes TTI boundaries 1422 and 1424.

In the illustrated example, the transmitter may use the subframe 1442 for CCA and hybrid preamble transmission. In such a case, the subframe 1442, which is the last subframe in the LTE frame 1440, may not be used for transmission in the LTE frame 1440. In the illustrated example, the CCA period 1432 begins at the TTI boundary 1422. In an LBE operation, a device may perform a Clear Channel Assessment (CCA) check using "energy detect" before transmitting on an unlicensed carrier. In some cases, the CCA period 1432 may be more than 18 µs. The hybrid preamble 1410 begins at a starting time 1420, when the channel is available for transmission based on CCA. The hybrid preamble 1410 ends on the TTI boundary 1424, where the LTE signal 1406 begins. In some cases, the LTE signal 1406 may occupy up to 10 ms based on regulatory requirements.

Figure 15:
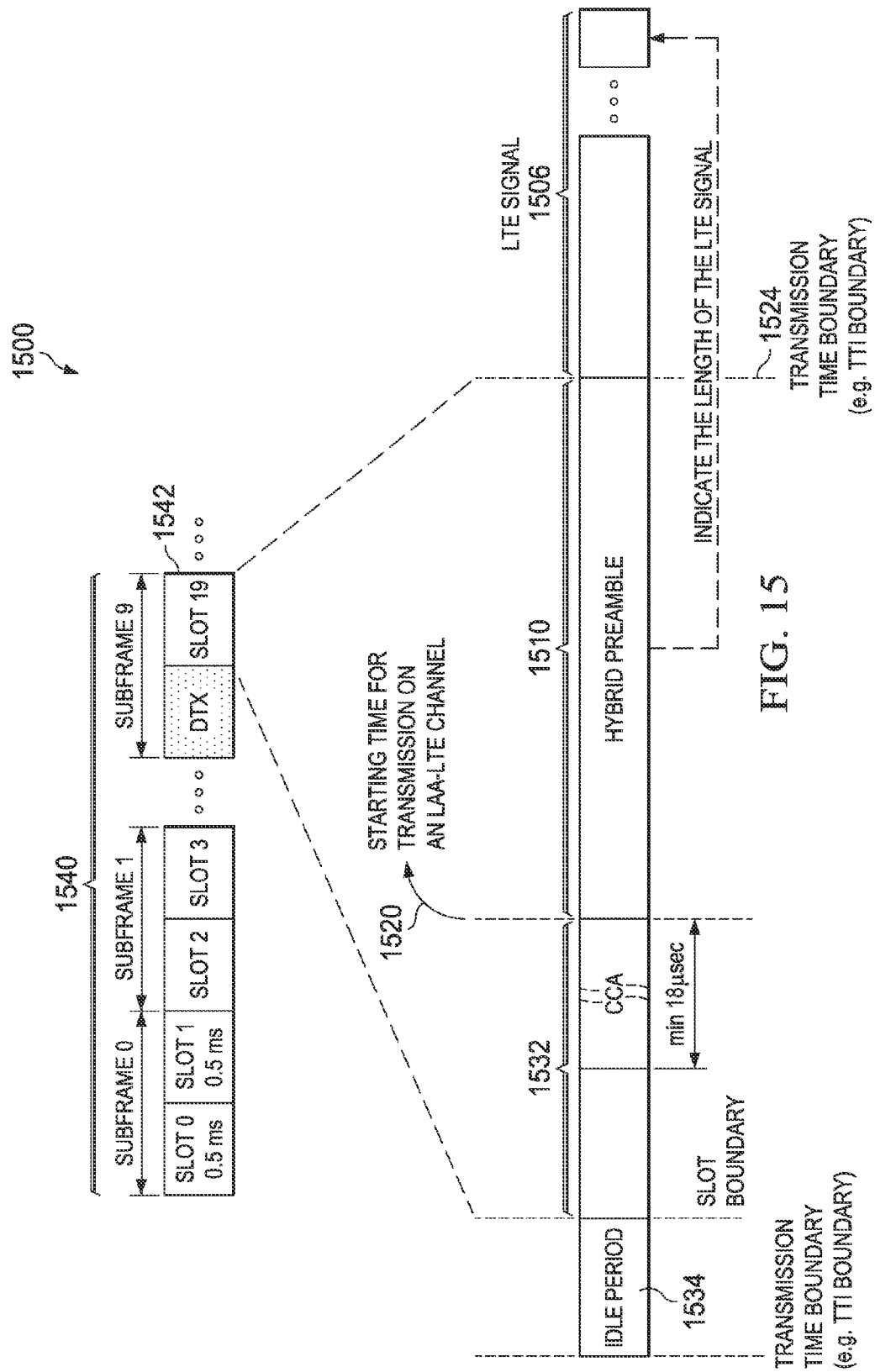
FIG. 15 is an example timing diagram illustrating a Downlink (DL) hybrid preamble structure in a Frame Based Equipment (FBE) operation.

FIG. 15 is an example timing diagram 1500 illustrating a Downlink (DL) hybrid preamble structure in a Frame Based Equipment (FBE) operation. The illustrated hybrid preamble may be used in either a TDD system or an FDD system. The timing diagram 1500 includes an LTE frame 1540, which includes a slot 1542. The timing diagram 1500 also includes an idle period 1534, a CCA period 1532, a hybrid preamble 1510, and an LTE signal 1506. In addition, the timing diagram 1400 includes TTI boundary 1524.

In an FBE operation, a device may perform a Clear Channel Assessment (CCA) check using "energy detect" before transmitting on an unlicensed carrier. The Channel Occupancy Time may be in the range of about 1 ms to about 10 ms. An idle period may be included before the CCA. In some cases, the idle period may be at least 5% of the Channel Occupancy Time used by the device for the current transmission period.

In the illustrated example, the eNB may use the slot 1542 for CCA and hybrid preamble transmission. In such a case, the eNB may not transmit DL LTE signal transmissions in the slot 1542, which is the last slot in the LTE frame 1540. In the illustrated example, the idle period 1534 begins at the TTI boundary prior to the slot 1542 (i.e. at the beginning of the slot preceding the slot 1542), followed by the CCA period 1532. In some cases, the CCA period 1532 may be more than about 18 µs. The hybrid preamble 1510 begins at a starting time 1520, when the channel is available for transmission based on CCA. The hybrid preamble 1510 ends on the TTI boundary 1524, where the LTE signal 1506 begins. In the illustrated example, the slot immediately prior to the slot 1542 is not transmitted and is referred to as the idle period, i.e., in a Discontinuous Transmission (DTX) mode.

Figure 16:
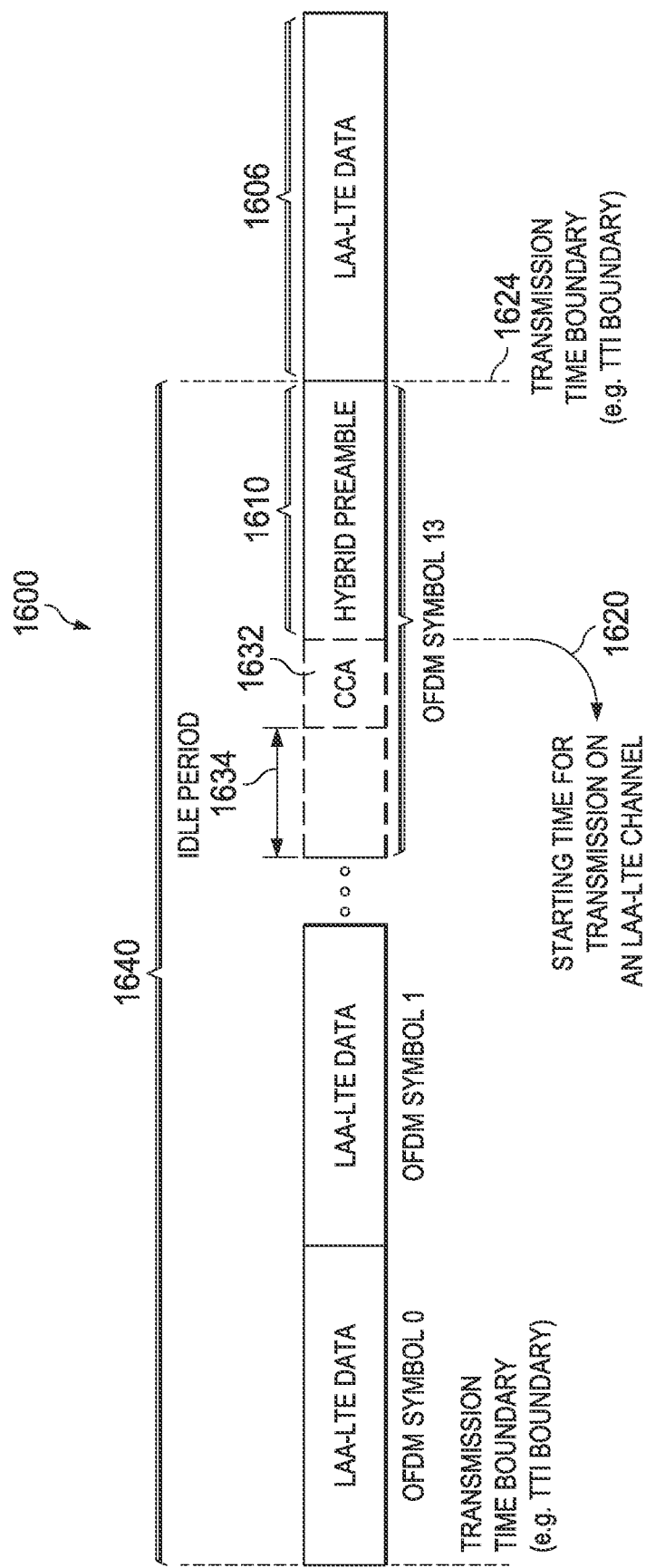
FIG. 16 is an example timing diagram illustrating a hybrid preamble structure in a Downlink (DL) punctured LTE subframe.

FIG. 16 is an example timing diagram 1600 illustrating a hybrid preamble structure in a Downlink (DL) punctured LTE subframe. The illustrated hybrid preamble may be used in either a TDD system or an FDD system. The timing diagram 1600 includes an LTE subframe 1640. The timing diagram 1600 also includes an idle period 1634, a CCA period 1632, and a hybrid preamble 1610. In addition, the timing diagram 1600 includes an LTE signal 1606 that begins at a TTI boundary 1624.

In the illustrated example, the LTE subframe 1640 may be punctured. In some cases, one OFDM symbol in the LTE subframe 1640 is used for CCA and hybrid preamble transmission and, therefore, is not used for LTE signal transmission. In these cases, the OFDM symbol is an untransmitted OFDM symbol. In the illustrated example, the last OFDM symbol is the untransmitted OFDM symbol in the LTE subframe 1640. In some cases, the untransmitted OFDM symbol may be the first OFDM symbol in the LTE subframe. In some cases, more than one OFDM symbols may be untransmitted, and the untransmitted OFDM symbols may be located at any position within the LTE subframe. In some cases, the transmitter may transmit the same amount of data in the punctured LTE subframe 1640 as other subframes in a transmission. In these cases, the code rate of the LTE subframe 1640 may be higher than other subframes. In the illustrated example, the idle period 1634 begins where last OFDM symbol begins, followed by the CCA period 1632. In some cases, the duration of the idle period 1634 may be about 50 µs. In some cases, the CCA period 1632 may be more than about 18 µs. The hybrid preamble 1610 begins at a starting time 1620, when the channel is available for access based on CCA. The hybrid preamble 1610 ends on the TTI boundary 1624, where the LTE signal 1606 begins. In some implementations, e.g., in an LBE operation, the idle period 1634 may be omitted. This approach may reduce the overhead for CCA and hybrid preamble transmission. In some cases, this approach may be used when the eNB scheduler determines whether or not to access the channel on a per TTI basis.

Figure 17:
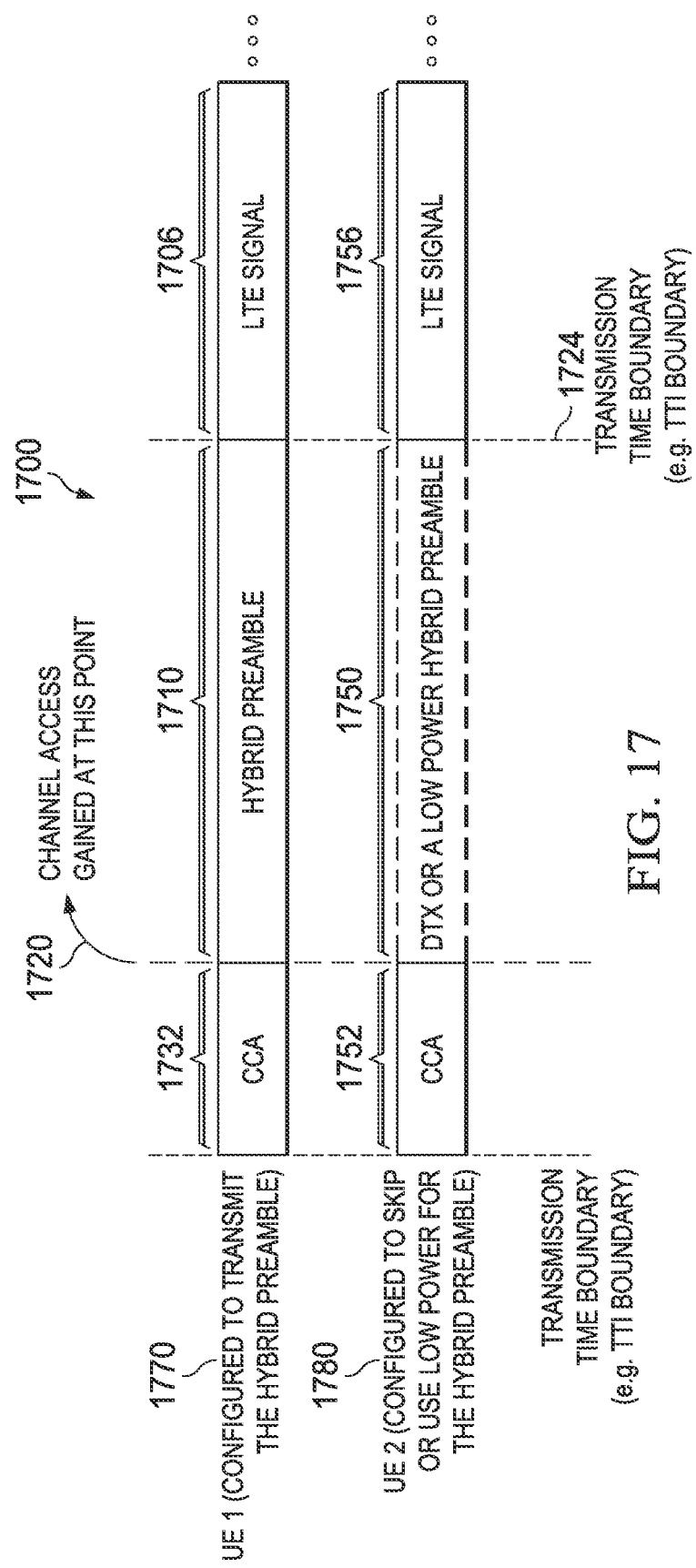
FIG. 17 is an example timing diagram illustrating a hybrid preamble structure with configurable transmission power.

FIG. 17 is an example timing diagram illustrating a hybrid preamble structure with configurable transmission power. In some cases, the UL transmission of the LAA-LTE channel may operate in scheduled mode. For example, an eNB may signal uplink grants for one or more of the UEs to transmit on a given subframe in the uplink of the unlicensed carrier. The grants may be sent on a separate paired downlink carrier operating in either licensed or unlicensed spectrum, or on the same carrier frequency in a TDD manner. Cross-carrier scheduling may be used, for example where the scheduling is transmitted on a downlink carrier which is paired with a different uplink carrier.

In general, a portion of the LTE frame structure may be left unused for LTE signal transmission. This is done to facilitate CCA and transmission of hybrid preamble by the transmitter in these unused portions of the LTE frame structure. This portion of unused LTE frame structure may be an LTE slot or an LTE subframe or one or more of LTE OFDM symbols in a given subframe. LAA transmitters may transmit hybrid preamble in this unused portions of the LTE frame structure. The unused portions of the frame structures are spaced such that the overall channel occupation of the LAA-LTE signal measured over a period of time doesn't exceed limits imposed by regulatory requirements.

Similar to downlink transmission, the uplink transmission on an LAA-LTE channel may last for one or more consecutive TTIs. The number of consecutive TTIs for which the UL will be occupied may be determined by the eNB and signaled to the UEs. In some cases, the number of consecutive TTIs may be specified in a specification. In some cases, multiple UEs can transmit on a given TTI in UL. If all the UEs transmitting on a given UL TTI transmit a hybrid preamble, they may create cross talk and decoding failure at WLAN devices. In some cases, the eNB may direct one or a few of the scheduled UEs to transmit the hybrid preamble at the normal output power. In some cases, the normal output power level may be the maximum nominal allowed UL output power in the band. Alternatively or in combination, the normal output level may be signaled to the UE. In some cases, the normal output power level may be the same output power level used for the transmission of the LTE signal following the hybrid preamble. The other UEs may perform the CCA but refrain from transmitting the hybrid preamble at the nominal output power. In some cases, some UEs may DTX (i.e., not transmit) the hybrid preamble. Alternatively or in combination, some UEs may transmit the hybrid preamble at a lower power. This approach may enable WLAN devices to detect one or more hybrid preambles.

In some cases, the eNB may select the UEs to DTX the hybrid preamble or to transmit the hybrid preamble at a reduced power based on the UEs' locations within the cell. For example, the eNB may configure the UEs that are spaced farthest apart in the cell to transmit the hybrid preamble at the normal power level. The eNB may configure other UEs around these UEs to DTX the hybrid preamble or to transmit the hybrid preamble at a reduced power level. In some cases, the eNB may select the UEs that DTX the hybrid preamble or to transmit the hybrid preamble at a reduced power level randomly, in a round-robin fashion, or based on a previous battery status indication from the UE to the eNB. For example, the eNB may select a UE that has indicated a power-constrained status to DTX the hybrid preamble to save battery power.

In some implementations, the eNB may send an indication to the UEs to configure the UEs to transmit the hybrid preamble at a normal power or at a reduced power, or to DTX the hybrid preamble. In some implementations, the eNB may transmit the indication with the UL grants or as part of the UL grants, e.g., on a PDCCH channel. In some implementations, the eNB may transmit the indication as part of Radio Resource Control (RRC) configuration.

In some cases, the reduced output power level used for transmitting the hybrid preamble may be a preconfigured low output power level. The reduced output power level may also be a power level which is lower than either the subsequent LTE signal transmission power level or the maximum nominal output power level by a preconfigured amount.

Turning to FIG. 17, the timing diagram 1700 includes a preamble structure for a first UE 1770 and a second UE 1780. Both the first UE 1770 and the second UE 1780 monitor the downlink and receive uplink grants. In the illustrated example, the first UE 1770 also receives an indication that configures the first UE 1770 to transmit the hybrid preamble at normal output power. The second UE 1780 receives an indication that configures the second UE 1780 to either DTX the preamble or transmit the hybrid preamble at a reduced power level. At a TTI boundary, the first UE 1770 performs CCA at the CCA period 1732 and the second UE 1780 performs CCA at the CCA period 1752. Upon the successful CCAs, both UEs determine a starting time 1720 to access the channel. At 1720, the first UE 1770 starts to transmit the hybrid preamble 1710 at normal power, while the second UE 1780 starts to transmit the hybrid preamble 1750 at a reduced power or to DTX the hybrid preamble 1750. At TTI boundary 1724, the first UE 1770 begins to transmit the LTE signal 1706 and the second UE 1780 begins to transmit the LTE signal 1756.

Figure 18:
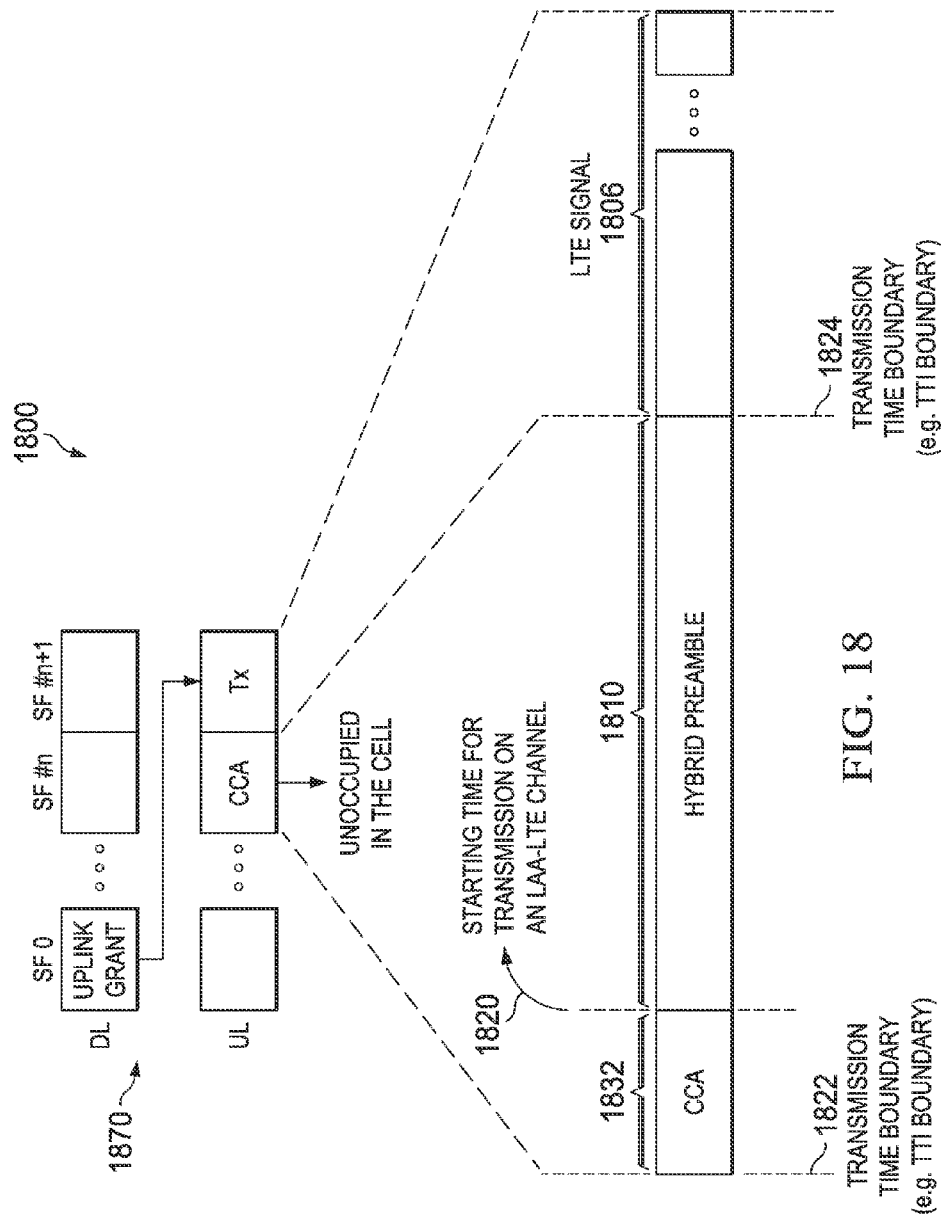
FIG. 18 is an example timing diagram illustrating an Uplink (UL) hybrid preamble structure.

FIG. 18 is an example timing diagram 1800 illustrating an Uplink (UL) hybrid preamble structure. The illustrated hybrid preamble may be used in either a TDD system or an FDD system. In the illustrated example, a UE receives a UL grant as indicated by reference 1870, which grants a UL transmission on the LAA-LTE channel at TTI boundary 1824. In the illustrated example, the preceding subframe, i.e., the subframe between the previous TTI boundary 1822 and the TTI boundary 1824, is not used for LTE transmission. For example, an eNB may not schedule any UL transmission on the LAA-LTE channel in the preceding subframe. In this case, the UE may perform CCA and transmit the hybrid preamble during the preceding subframe (i.e. the subframe between TTI boundary 1822 and the next TTI boundary 1824). In the illustrated example, the UE performs CCA during the CCA period 1832, determines a starting time 1820 to transmit on the unlicensed carrier based on the CCA, transmits the hybrid preamble 1810 between the starting time 1820 and the TTI boundary 1824, and begins to transmit the LTE signal 1806 at TTI boundary 1824. In some cases, the CCA period 1832 may begin after the TTI boundary 1822.

Figure 19:
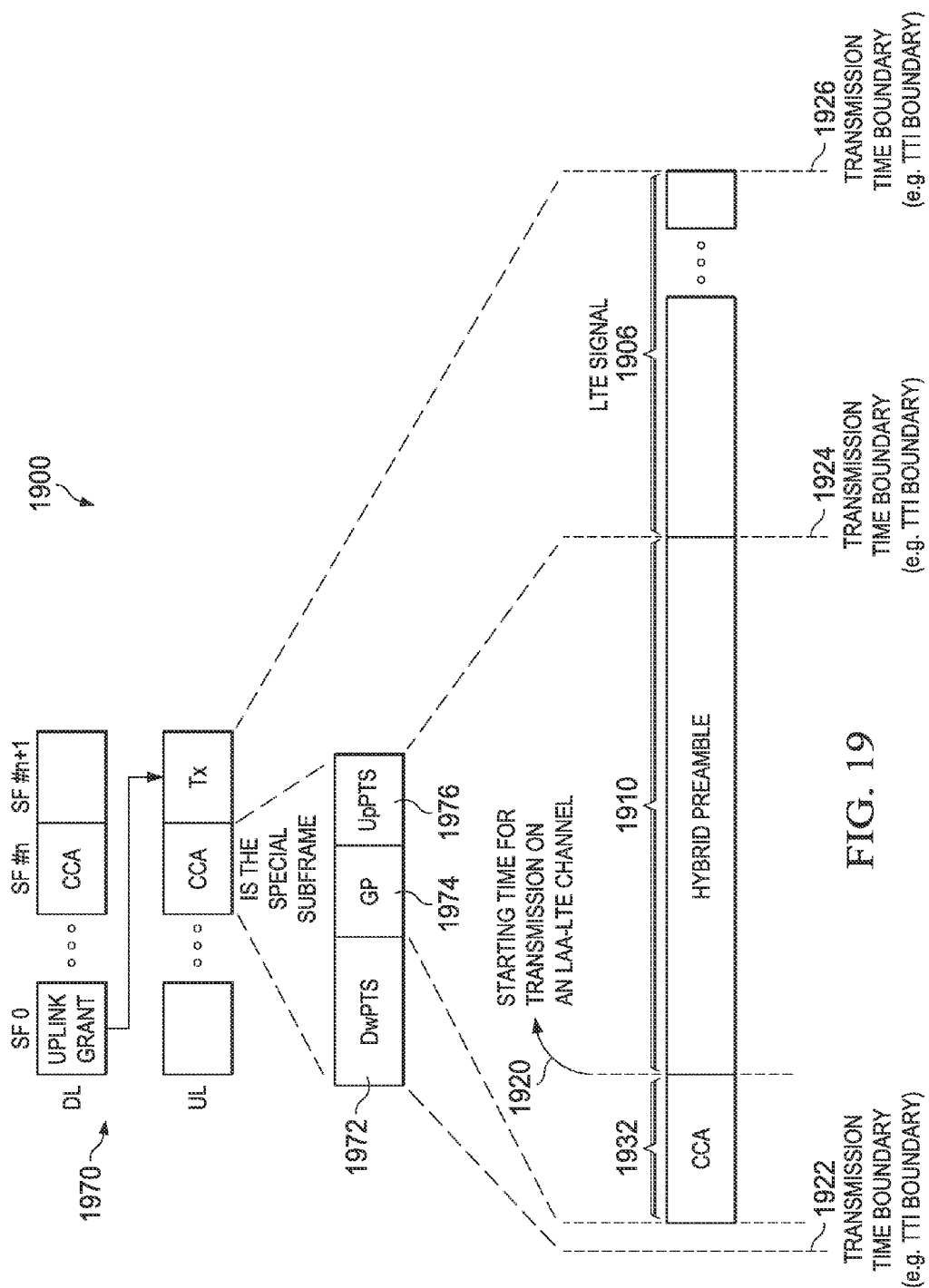
FIG. 19 is an example timing diagram illustrating a hybrid preamble structure in a Time Division Multiplex (TDD) operation.

FIG. 19 is an example timing diagram 1900 illustrating a hybrid preamble structure in a Time Division Multiplex (TDD) operation. In the illustrated example, a UE receives a UL grant as indicated by reference 1970, which grants a UL transmission on the LAA-LTE channel at TTI boundary 1924. In the illustrated example, the preceding subframe, i.e., the subframe between the previous TTI boundary 1922 and the TTI boundary 1924, is a special TDD subframe. The special TDD subframe includes a DwPTS 1972, a GP 1974, and an UpPTS 1976. In the illustrated example, the UE may perform CCA and transmit the hybrid preamble during the GP 1974 and the UpPTS 1976. In the illustrated example, the UE performs CCA during the CCA period 1932, determines a starting time 1920 to access the channel, transmits the hybrid preamble 1910 between the starting time 1920 and the TTI boundary 1924, and begins to transmit the LTE signal 1906 at TTI boundary 1924.

In some implementations, a special subframe format with a longer GP length, e.g., format 0 specified in 3GPP TS 36.211, may be used to increase the time for CCA. In some cases, the eNB may also DTX the DwPTS 1972, so that CCA may start from the beginning of the TTI boundary 1922. In some instances, the system information may signal whether the DwPTS 1972 of the special TDD subframe is DTXed or not. If the DwPTS 1972 is DTXed, then the UE may start CCA from the TTI boundary 1922. If the DwPTS 1972 is not DTXed, i.e., used for DL transmission, the UE may start CCA from the GP 1974.

Figure 20:
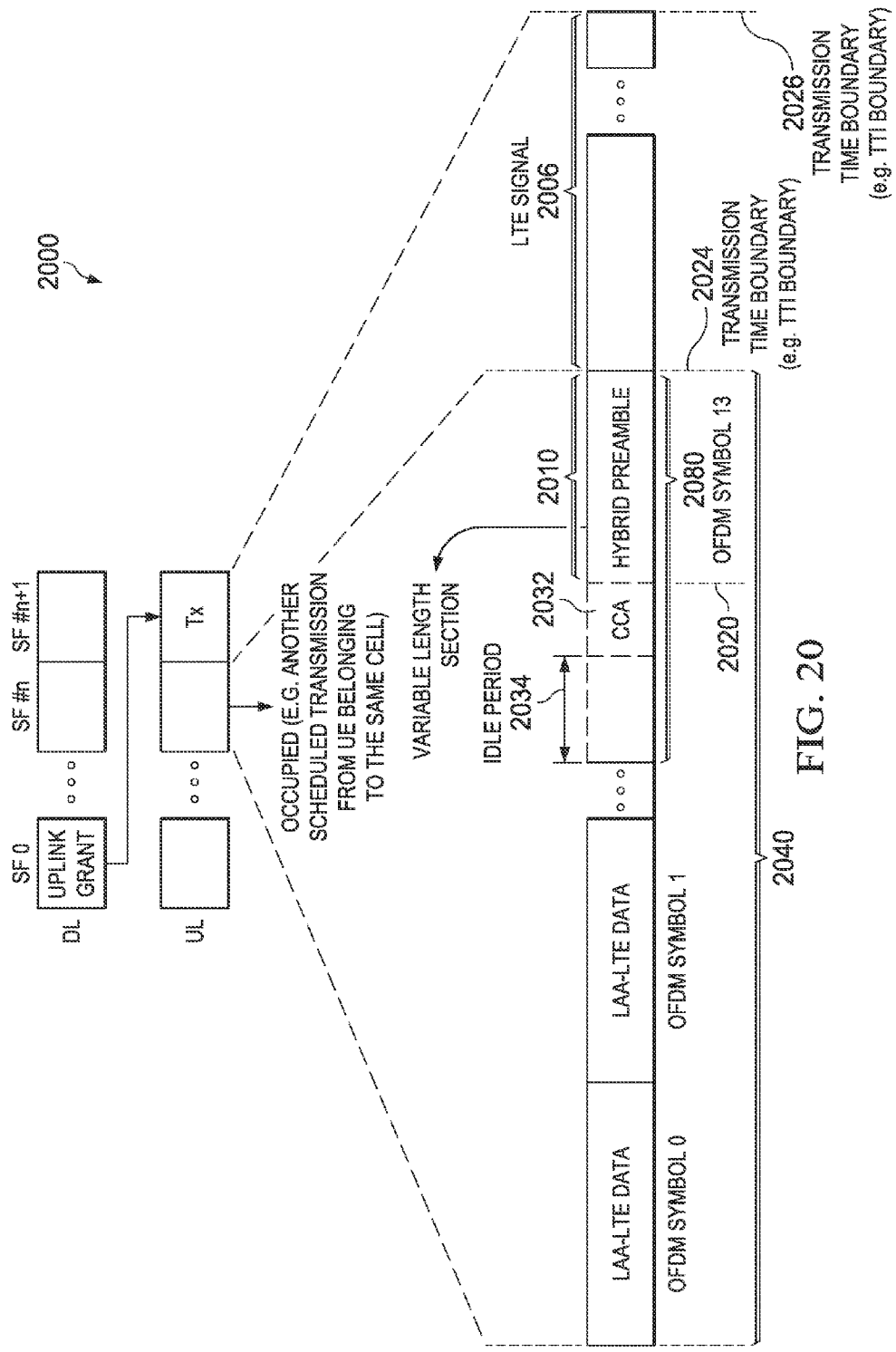
FIG. 20 is an example timing diagram illustrating a hybrid preamble structure in an Uplink (UL) punctured LTE subframe.

FIG. 20 is an example timing diagram illustrating a hybrid preamble structure in an Uplink (UL) punctured LTE subframe. The illustrated hybrid preamble may be used in either a TDD system or an FDD system. The timing diagram 2000 includes an LTE subframe 2040. The timing diagram 2000 also includes an idle period 2034, a CCA period 2032, and a hybrid preamble 2010. In addition, the timing diagram 2000 includes an LTE signal 2006 that begins at a TTI boundary 2024. In the illustrated example, similar to the DL operation described in FIG. 16, the LTE subframe 2040 is punctured. In some cases, an eNB may determine whether to leave the subframe preceding the scheduled transmission unoccupied or whether to schedule a punctured LTE subframe in the subframe preceding the scheduled transmission unoccupied. In some cases, the eNB may make the determination based on the channel quality applicable to the preceding subframe. The channel quality may be determined based on measurement reports or measurement of previous transmissions by the same. If the channel quality is low, e.g., the path loss is high, the eNB may determine to leave the preceding subframe unscheduled, e.g., as illustrated in the example in FIG. 18.

In some cases, the eNB may signal to a UE, e.g., on the PDCCH channel, whether an LTE subframe is punctured. For example, the eNB may signal to UE to puncture the last OFDM symbol of the scheduled UL transmission. Alternatively, an eNB may signal to the UE to transmit a regular LTE subframe without puncturing.

In some cases, the eNB may signal to a UE whether the subframe preceding the scheduled transmission is unoccupied. In some cases, the eNB may signal to the UE that the subframe preceding the scheduled transmission is punctured.

In the illustrated example, the LTE subframe 2040 may be punctured. In some cases, at least one OFDM symbol in the LTE subframe 2040 is used for CCA and hybrid preamble transmission and, therefore, is not used for LTE signal transmission. In these cases, the at least one OFDM symbol is an untransmitted OFDM symbol. In the illustrated example, the last OFDM symbol is the untransmitted OFDM symbol in the LTE subframe 2040. In some cases, the untransmitted OFDM symbol may be the first OFDM symbol in the LTE subframe. In some cases, more than one OFDM symbols may be untransmitted and the untransmitted OFDM symbols may be located at any position within the LTE subframe. In the illustrated example, the idle period 2034 begins at the same time when the last OFDM symbol begins, followed by the CCA period 2032. In some cases, the duration of the idle period 2034 may be about 50 μs. In some cases, the CCA period 2032 may be more than about 18 μs. The hybrid preamble 2010 begins at a starting time 2020, when the channel is available for access based on CCA. The hybrid preamble 2010 ends on the TTI boundary 2024, where the LTE signal 2006 begins. In some implementations, e.g., in an LBE operation, the idle period 2034 may be omitted.

Figure 21:
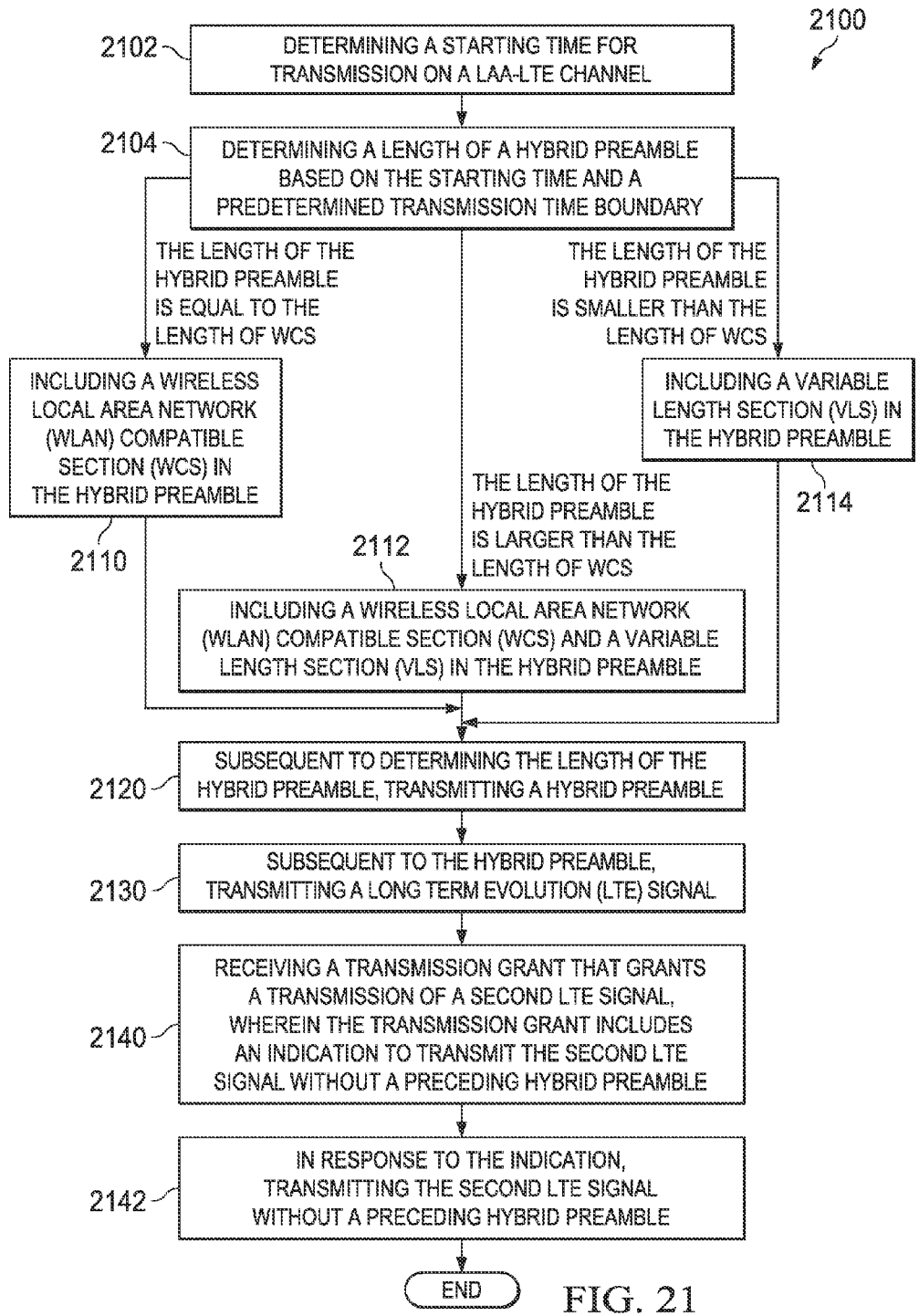
FIG. 21 is a flowchart illustrating an example method for sharing a channel in an LAA-LTE operation.

FIG. 21 is a flowchart illustrating an example method 2100 for sharing a channel in an LAA-LTE operation. The method 2100 may begin at block 2102, where a starting time for transmission on an LAA-LTE channel is determined. In some cases, block 2102 involves at least one of performing CCA and determining that the channel is unoccupied. In some implementations, the LAA-LTE channel is an unlicensed carrier that is configured for a licensed-assisted operation. In some cases, the determination may be performed by an evolved Node B (eNB) prior to a Downlink (DL) transmission by the eNB via CCA. Alternatively or in combination, the determination may be performed by a User Equipment (UE) prior to an Uplink (UL) transmission by the UE.

At block 2104, a length of a hybrid preamble is determined based on the starting time and a predetermined transmission time boundary. In some cases, the predetermined transmission time boundary is a Transmission Time Interval (TTI) boundary. In some cases, at block 2110, the hybrid preamble includes a Wireless Local Area Network (WLAN) Compatible Section (WCS) that indicates a length of the LTE signal. In these cases, the length of the hybrid preamble is equal to the length of a Wireless Local Area Network (WLAN) Compatible Section (WCS). In some cases, at block 2112, the hybrid preamble includes a Wireless Local Area Network (WLAN) Compatible Section (WCS) and a Variable Length Section (VLS). The WCS may indicate a length of the LTE signal. The VLS may have a length that is determined based on a difference between the length of the hybrid preamble and a length of the WCS. In these cases, the length of the hybrid preamble is larger than the length of a WCS. In some cases, at block 2114, the hybrid preamble includes a Variable Length Section (VLS) having a length that is determined based on the length of the hybrid preamble. In these cases, the length of the hybrid preamble is smaller than the length of a WCS.

In some cases, the hybrid preamble contains only a VLS section regardless of the length of the hybrid preamble.

At block 2120, subsequent to the determination of the length of the hybrid preamble, the hybrid preamble having the determined length is transmitted. In some cases, the transmission may be a DL transmission that is transmitted by the eNB. Alternatively or in combination, the transmission may be a UL transmission that is transmitted by the UE. In some cases, prior to transmitting the hybrid preamble, a transmission grant that grants a transmission of the LTE signal and an indication that indicates a transmission power level of the hybrid preamble may be received. The indication may indicate that the hybrid preamble is transmitted at a normal power level or at a reduced power level. In these cases, the hybrid preamble may be transmitted in accordance with the indication.

In some implementations, the hybrid preamble is transmitted in a first subframe prior to the predetermined transmission time boundary and the LTE signal is transmitted in a second subframe after the predetermined transmission time boundary. In some cases, the first subframe includes an LTE signal adapted to occupy only a subset of symbols in the first subframe. In these cases, the hybrid preamble is transmitted during a time period corresponding to symbols not within the subset.

At block 2130, subsequent to the hybrid preamble, a Long Term Evolution (LTE) signal may be transmitted. In some cases, at block 2140, a transmission grant that grants a transmission of a second LTE signal is received. The transmission grant may include an indication to transmit the second LTE signal without a preceding hybrid preamble. At block 2142, in response to the indication, the second LTE signal is transmitted without a preceding hybrid preamble.

FIG. 22 is a block diagram illustrating an example user equipment (UE) device 2200. The illustrated device 2200 includes a processing unit 2202, a computer-readable storage medium 2204 (for example, ROM or flash memory), a wireless communication subsystem 2206, a user interface 2208, and an I/O interface 2210.

The processing unit 2202 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 2202 may be configured to generate control information, such as a measurement report, or respond to received information, such as control information from a network node. The processing unit 2202 may also be configured to make an Radio Resource Management (RRM) decision such as cell selection/reselection information or trigger a measurement report. The processing unit 2202 can also include other auxiliary components, such as random access memory (RAM) and read-only memory (ROM). The computer-readable storage medium 2204 can store an operating system (OS) of the device 2200 and various other computer-executable instructions, logic or software programs for performing one or more of the processes, steps, or actions described above.

The wireless communication subsystem 2206 may be configured to provide wireless communication for voice, data and/or control information provided by the processing unit 2202. The wireless communication subsystem 2206 can include, for example, one or more antennas, a receiver, a transmitter, a local oscillator, a mixer, and a digital signal processing (DSP) unit. In some implementations, the subsystem 2206 can support multiple input multiple output (MIMO) transmissions. In some implementations, the receiver in the wireless communication subsystems 2206 can be an advance receiver or a baseline receiver. Two receivers can be implemented with identical, similar, or different receiver processing algorithms.

The user interface 2208 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 2210 can include, for example, a universal serial bus (USB) interface. Various other components can also be included in the device 2200. A number of embodiments of the invention have been described. Nevertheless, it will be understood that various modifications may be made. Accordingly, other embodiments are within the scope of the following claims.

FIG. 23 is a block diagram illustrating an example eNB 2300. The illustrated eNB 2300 includes a processing module 2302, a wired communication subsystem 2304, and a wireless communication subsystem 2306. The wireless communication subsystem 2306 can receive data traffic and control traffic from the UE. In some implementations, the wireless communication subsystem 2306 may include a receiver and a transmitter. The wired communication subsystem 2304 can be configured to transmit and receive control information between other access node devices via backhaul connections. The processing module 2302 can include one or more processing components (alternatively referred to as "processors" or "central processing units" (CPUs)) capable of executing instructions related to one or more of the processes, steps, or actions described above in connection with one or more of the implementations disclosed herein. The processing module 2302 can also include other auxiliary components, such as random access memory (RAM), read-only memory (ROM), secondary storage (for example, a hard disk drive or flash memory). In some implementations, the processing module 2302 may be configured to generate control information or respond to received information such as a measurement report transmitted from a UE. The processing module 2302 may also be configured to make an RRM decision based at least in part on the information transmitted from the UE, such as cell selection/reselection information or the measurement report. The processing module 2302 can execute certain instructions and commands to provide wireless or wired communication, using the wired communication subsystem 2304 or a wireless communication subsystem 2306. Various other components can also be included in the eNB 2300.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

What is claimed is:

1. A method for transmitting on a Licensed-Assisted Access in Long Term Evolution (LAA-LTE) channel, comprising:
   determining a starting time for transmission on the LAA-LTE channel;

determining a length of a hybrid preamble based on the starting time and based on a predetermined transmission time boundary;
transmitting, subsequent to determining the length of the hybrid preamble, the hybrid preamble having the determined length, wherein the hybrid preamble is transmitted in a first subframe that is prior to the predetermined transmission time boundary;
transmitting, subsequent to transmission of the hybrid preamble, a Long Term Evolution (LTE) signal, wherein the LTE signal is transmitted in a second subframe different than the first subframe, the second subframe being after the predetermined transmission time boundary;
receiving or transmitting a grant regarding a second LTE signal, wherein the grant includes an indication to configure the second LTE signal without a preceding hybrid preamble;
in response to the indication, receiving or transmitting the second LTE signal without a preceding hybrid preamble; and
wherein the first subframe comprises a second LTE signal that occupies a subset of fewer than all orthogonal frequency-division multiplexing (OFDM) symbols in the first subframe, and wherein the hybrid preamble is transmitted during a time period corresponding to OFDM symbols not within the subset.

2. The method of claim 1, wherein the predetermined transmission time boundary is a Transmission Time Interval (TTI) boundary.

3. The method of claim 1, wherein the hybrid preamble comprises a Wireless Local Area Network (WLAN) Compatible Section (WCS) that indicates a length of the LTE signal.

4. The method of claim 3, wherein the length of the hybrid preamble is equal to a duration of the Wireless Local Area Network (WLAN) Compatible Section (WCS).

5. The method of claim 1, wherein the hybrid preamble comprises a Wireless Local Area Network (WLAN) Compatible Section (WCS) and a Variable Length Section (VLS), and the WCS indicates a length of the LTE signal and the VLS has a length that is determined based on a difference between the length of the hybrid preamble and a length of the WCS.

6. The method of claim 5 wherein the length of the hybrid preamble is larger than the length of the WCS.

7. The method of claim 1, wherein the hybrid preamble comprises a Variable Length Section (VLS) having a length that is determined based on the length of the hybrid preamble.

8. The method of claim 1, further comprising:
receiving, prior to transmitting the hybrid preamble, a transmission grant that grants a transmission of the LTE signal and an indication that indicates a transmission power level of the hybrid preamble; and
transmitting, in response to the transmission grant, the hybrid preamble in accordance with the indication.

9. The method of claim 8, wherein the indication indicates that the hybrid preamble is transmitted at a normal power level or at a reduced power level.

10. The method of claim 1, wherein the LAA-LTE channel is an unlicensed carrier that is configured for a Licensed-Assisted operation.

11. The method of claim 1, wherein the hybrid preamble is transmitted by a User Equipment (UE).

12. The method of claim 1, wherein the hybrid preamble is transmitted by an evolved Node B (eNB).

13. A user equipment (UE), comprising:
a memory; and
at least one hardware processor communicatively coupled with the memory and configured to:
determine a starting time for transmission on a Licensed-Assisted Access in Long Term Evolution (LAA-LTE) channel;
determine a length of a hybrid preamble based on the starting time and based on a predetermined transmission time boundary;
transmit, subsequent to determining the length of the hybrid preamble, the hybrid preamble having the determined length, wherein the hybrid preamble is transmitted in a first subframe that is prior to the predetermined transmission time boundary; and
transmit, subsequent to transmission of the hybrid preamble, a Long Term Evolution (LTE) signal, wherein the LTE signal is transmitted in a second subframe different than the first subframe, the second subframe being after the predetermined transmission time boundary;
receive or transmit a grant regarding a second LTE signal, wherein the grant includes an indication to configure the second LTE signal without a preceding hybrid preamble;
in response to the indication, receive or transmit the second LTE signal without a preceding hybrid preamble; and
wherein the first subframe comprises a second LTE signal that occupies a subset of fewer than all orthogonal frequency-division multiplexing (OFDM) symbols in the first subframe, and wherein the hybrid preamble is transmitted during a time period corresponding to OFDM symbols not within the subset.

14. The UE of claim 13, wherein the predetermined transmission time boundary is a Transmission Time Interval (TTI) boundary.

15. The UE of claim 13, wherein the hybrid preamble comprises a Wireless Local Area Network (WLAN) Compatible Section (WCS) that indicates a length of the LTE signal.

16. The UE of claim 15, wherein the length of the hybrid preamble is equal to a duration of the Wireless Local Area Network (WLAN) Compatible Section (WCS).

17. A base station, comprising:
a memory; and
at least one hardware processor communicatively coupled with the memory and configured to:
determine a starting time for transmission on a Licensed-Assisted Access in Long Term Evolution (LAA-LTE) channel;
determine a length of a hybrid preamble based on the starting time and based on a predetermined transmission time boundary;
transmit, subsequent to determining the length of the hybrid preamble, the hybrid preamble having the determined length, wherein the hybrid preamble is transmitted in a first subframe that is prior to the predetermined transmission time boundary;
transmit, subsequent to transmission of the hybrid preamble, a Long Term Evolution (LTE) signal, wherein the LTE signal is transmitted in a second subframe different than the first subframe, the second subframe being after the predetermined transmission time boundary;

transmit, to a user equipment (UE), a transmission grant that grants a transmission of a second LTE signal, wherein the transmission grant includes an indication to transmit the second LTE signal without a preceding hybrid preamble; and in response to the indication, receiving, from the UE, the second LTE signal without a preceding hybrid preamble;

wherein the first subframe comprises a second LTE signal that occupies a subset of fewer than all orthogonal frequency-division multiplexing (OFDM) symbols in the first subframe, and wherein the hybrid preamble is transmitted during a time period corresponding to OFDM symbols not within the subset.

* * * * *